(12) United States Patent
Gejima

(10) Patent No.: US 9,522,535 B2
(45) Date of Patent: Dec. 20, 2016

(54) LIQUID DISCHARGE HEAD AND RECORDING APPARATUS

(71) Applicant: KYOCERA Corporation, Kyoto-shi, Kyoto (JP)

(72) Inventor: Kenko Gejima, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 14/899,294

(22) PCT Filed: May 29, 2014

(86) PCT No.: PCT/JP2014/064270
§ 371 (c)(1),
(2) Date: Dec. 17, 2015

(87) PCT Pub. No.: WO2014/203705
PCT Pub. Date: Dec. 24, 2014

(65) Prior Publication Data
US 2016/0144624 A1    May 26, 2016

(30) Foreign Application Priority Data

Jun. 21, 2013 (JP) ................................. 2013-130694

(51) Int. Cl.
*B41J 2/14* (2006.01)
*B41J 11/00* (2006.01)
(Continued)

(52) U.S. Cl.
CPC ......... *B41J 2/14201* (2013.01); *B41J 2/14233* (2013.01); *B41J 11/002* (2013.01);
(Continued)

(58) Field of Classification Search
None
See application file for complete search history.

(56) References Cited

U.S. PATENT DOCUMENTS

2005/0041074 A1    2/2005  Watanabe et al.
2005/0057613 A1*   3/2005  Watanabe ............ B41J 2/14209
                                                       347/68
(Continued)

FOREIGN PATENT DOCUMENTS

EP          1495869 A1    1/2005
JP       2005-022148 A    1/2005
(Continued)

OTHER PUBLICATIONS

International Search Report, PCT/JP2014/064270, Sep. 2, 2014, 2 pgs.
(Continued)

*Primary Examiner* — Lisa M Solomon
(74) *Attorney, Agent, or Firm* — Volpe and Koenig, P.C.

(57) ABSTRACT

A liquid discharge head and a recording apparatus are each capable of reducing a malfunction possibility that occurs on a piezoelectric actuator substrate due to contact between individual electrodes and a liquid. The liquid discharge head includes a head body including a flow channel member, a piezoelectric actuator substrate having a plurality of individual electrodes, a flexible wiring substrate, and an adhesive member adhering the flexible wiring substrate and head body, and surrounds the individual electrodes. When a surface of the head body surrounded by the adhesive member is a first region, and a surface of the head body other than the first region is a second region, the head body has a first through hole connecting the first region and the second region to permit communication between a space surrounded by the flexible wiring substrate, adhesive member, first region, and an outside other than the space.

20 Claims, 11 Drawing Sheets

(51) Int. Cl.
   *C09D 11/101* (2014.01)
   *C09D 11/30* (2014.01)
   *C09D 11/106* (2014.01)

(52) U.S. Cl.
   CPC ............... *B41J 2002/14459* (2013.01); *B41J 2002/14491* (2013.01); *C09D 11/101* (2013.01); *C09D 11/106* (2013.01); *C09D 11/30* (2013.01)

(56) References Cited

U.S. PATENT DOCUMENTS

| | | |
|---|---|---|
| 2005/0237365 A1 | 10/2005 | Hiwada |
| 2005/0285909 A1 | 12/2005 | Murata et al. |
| 2008/0049077 A1 | 2/2008 | Sugahara |
| 2008/0303865 A1 | 12/2008 | Watanabe et al. |
| 2011/0134191 A1 | 6/2011 | Kajiura |

FOREIGN PATENT DOCUMENTS

| | | | |
|---|---|---|---|
| JP | 2005-305982 A | 11/2005 |
| JP | 2006-044225 A | 2/2006 |
| JP | 2006-289965 A | 10/2006 |
| JP | 2008-074091 A | 4/2008 |
| JP | 2008-200909 A | 9/2008 |
| JP | 2011-121186 A | 6/2011 |

OTHER PUBLICATIONS

Japanese Office Action with concise English explanation, Japanese Patent Application No. 2015-522709, Oct. 11, 2016, 4 pgs.

\* cited by examiner

Fig. 2
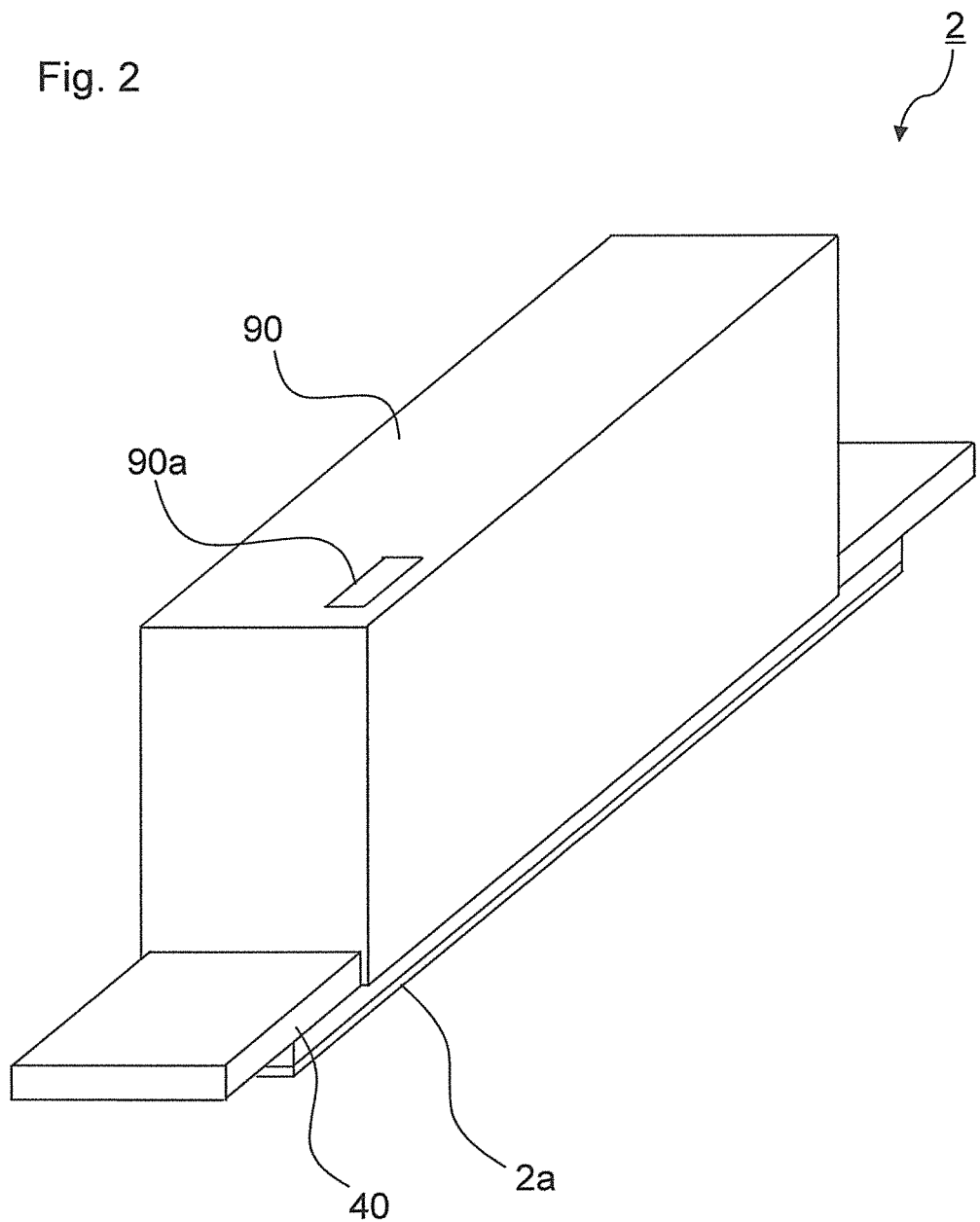
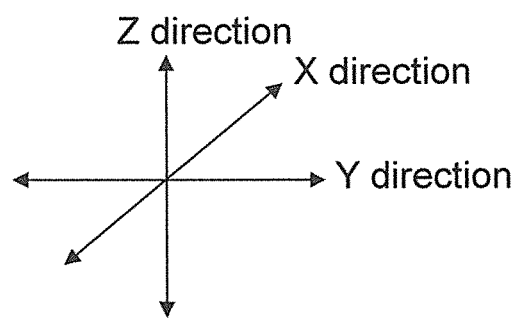

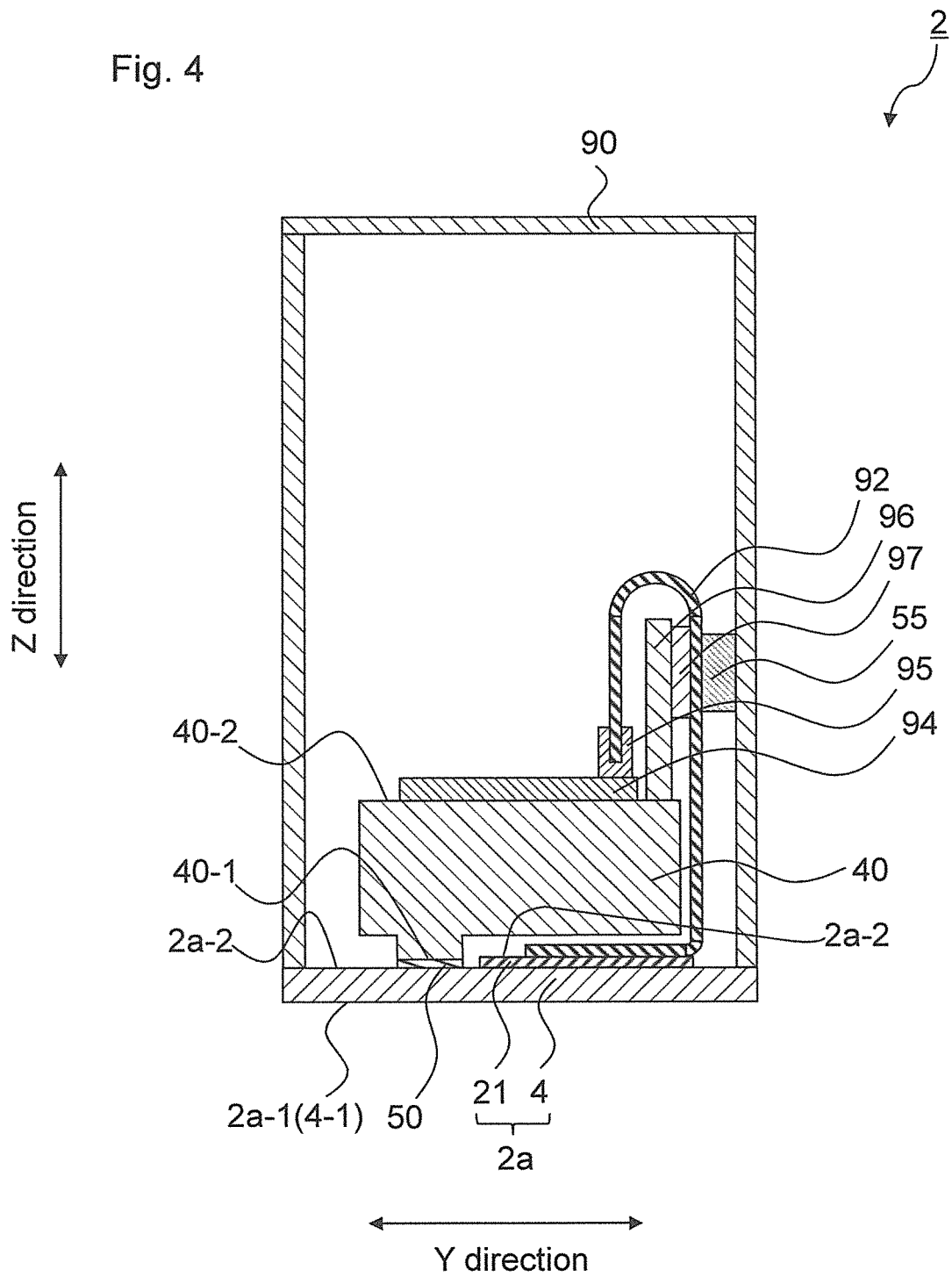

LIQUID DISCHARGE HEAD AND RECORDING APPARATUS

TECHNICAL FIELD

The present invention relates to a liquid discharge head and a recording apparatus.

BACKGROUND ART

As a liquid discharge head, there has conventionally been known, for example, one that performs various kinds of printing by discharging droplets of ink onto a recording medium. This liquid discharge head includes a flow channel member having a plurality of discharge holes and a plurality of pressurizing chambers respectively independently connected to the discharge holes. A piezoelectric actuator substrate having thereon a plurality of individual electrodes for pressurizing the pressurizing chambers is disposed on the flow channel member. A flexible wiring substrate for supplying a driving signal to the individual electrodes is connected to the individual electrodes. This liquid discharge head is capable of discharging a liquid in the pressurizing chambers through the discharge holes by pressurizing the pressurizing chambers according to the driving signal supplied from the flexible wiring substrate to the individual electrodes. Here, the flexible wiring substrate is adhered to the piezoelectric actuator substrate with, for example, an adhesive member interposed therebetween. The adhesive member is disposed so as to surround the individual electrodes in a plan view (for example, refer to Patent Document 1). This makes it possible to reduce the possibility that the liquid may come into contact with the individual electrodes.

PRIOR ART DOCUMENT

Patent Document

Patent Document 1: Japanese Unexamined Patent Publication No. 2011-121186

SUMMARY OF THE INVENTION

Problems to be Solved by the Invention

In the above conventional liquid discharge head, a space surrounded by the piezoelectric actuator substrate, the flexible wiring substrate, and the adhesive member is closed. Consequently, for example, when heat is transferred to the liquid discharge head during manufacturing processes of the liquid discharge head or during the use thereof, air in the space may expand. The expansion of the air in the space may cause separation of the flexible wiring substrate from the piezoelectric actuator substrate. Therefore, due to the liquid entering between the flexible wiring substrate and the piezoelectric actuator substrate, the individual electrodes and the liquid may come into contact with the liquid, and a malfunction may occur on the piezoelectric actuator substrate.

The present invention has been made in view of the above circumstance, and it is an object of the present invention to provide a liquid discharge head and a recording apparatus which are capable of reducing the possibility that a malfunction occurs on the piezoelectric actuator substrate due to the contact between the individual electrodes and the liquid.

Means for Solving the Problems

An embodiment of the liquid discharge head of the present invention includes a head body including a flow channel member that has a plurality of discharge holes and a plurality of pressurizing chambers respectively individually connected to the discharge holes, and a piezoelectric actuator substrate that has a plurality of individual electrodes to pressurize the pressurizing chambers, and is disposed on the flow channel member, a flexible wiring substrate electrically connected to the individual electrodes, and an adhesive member adhering the flexible wiring substrate and the head body and surrounding the individual electrodes in a plan view. When a surface of the head body surrounded by the adhesive member is taken as a first region, and a surface of the head body other than the first region is taken as a second region in the plan view, the head body includes a first through hole permits communication between a first opening that opens into the first region and a second opening that opens into the second region. The first through hole permits communication between a space surrounded by the flexible wiring substrate, the adhesive member, and the first region, and an outside other than the space.

An embodiment of the recording apparatus of the present invention includes the liquid discharge head according to the present invention, and a transport section that transports a recording medium to the liquid discharge head.

Effect of the Present Invention

The liquid discharge head and the recording apparatus according to the present invention produce the effect of reducing the possibility that a malfunction occurs on the piezoelectric actuator substrate due to contact between the individual electrodes and the liquid.

BRIEF DESCRIPTION OF THE DRAWINGS

FIG. 2 is a perspective view schematically showing a configuration of a liquid discharge head according to the embodiment;

FIG. 4 is a sectional view in a transverse direction of the liquid discharge head according to the embodiment;

EMBODIMENTS FOR CARRYING OUT THE INVENTION

Figure 1:
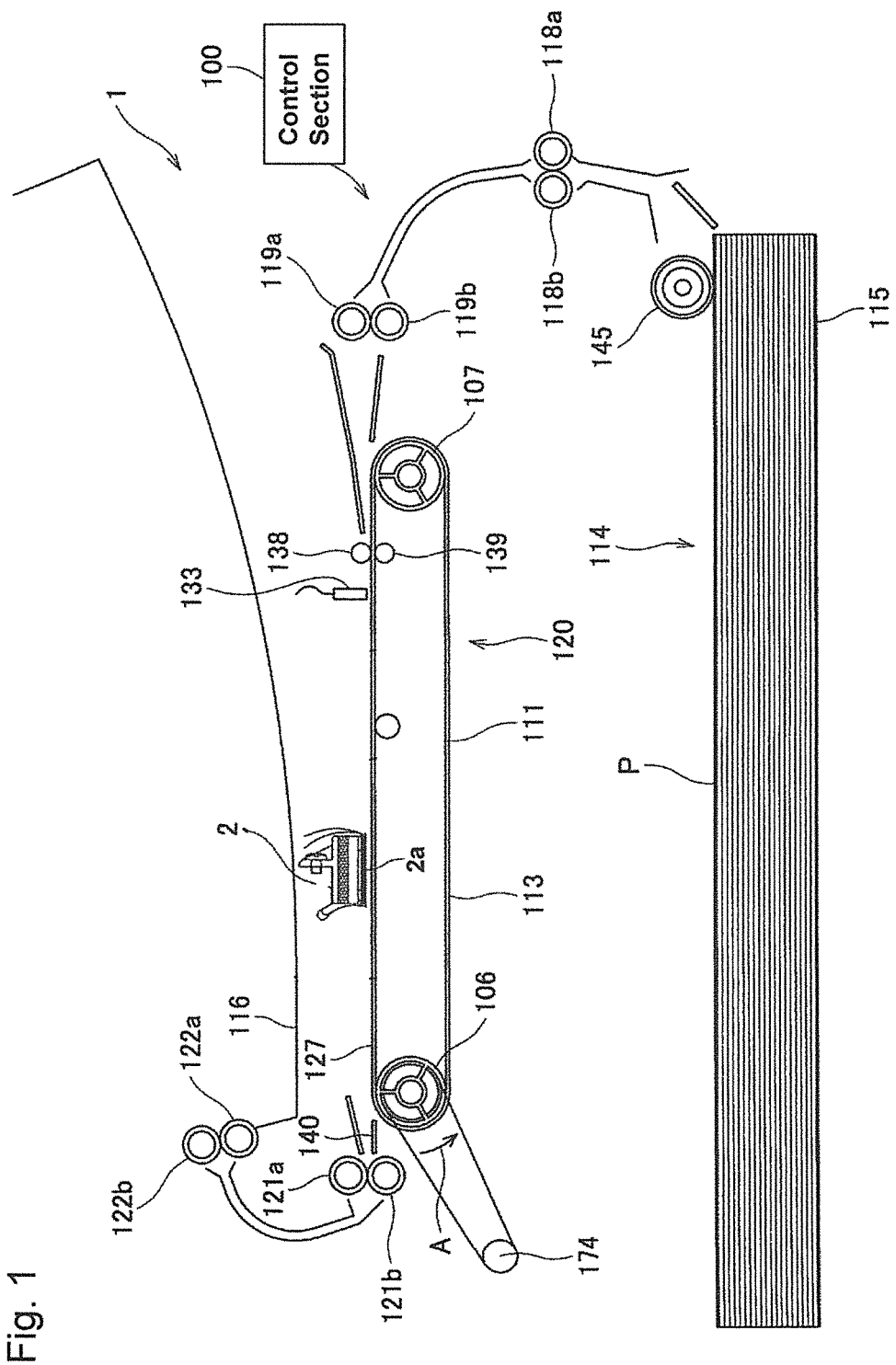
FIG. 1 is a schematic block diagram of a printer according to an embodiment.

Embodiments of the present invention are described below with reference to the drawings.

For the sake of description, the drawings referred to in the following show, in simplified form, major members necessary for describing the present invention among constituent members of an embodiment of the present invention. Therefore, the liquid discharge head and the recording apparatus according to the present invention may include any optional constituent member not shown in the drawings referred to in the present description.

FIG. 1 is a schematic block diagram of a printer 1 according to an embodiment. In the present embodiment, the printer 1 is a color inkjet printer without limitation thereto. The printer 1 may be a recording apparatus, such as a monochrome inkjet printer.

The printer 1 includes a control section 100, a paper feed unit 114, a transport unit 120, a liquid discharge head 2, and a paper receiving part 116. Here, the liquid discharge head 2 and the transport unit 120 in the printer 1 constitute an embodiment of the recording apparatus of the present invention.

The control section 100 has a role in controlling operations in the above-mentioned members. Placement of the control section 100 is not particularly limited.

The paper feed unit 114 includes a paper accommodating case 115 and a paper feed roller 145. The paper accommodating case 115 has a role in accommodating a recording medium. In the present embodiment, a plurality of printing papers P as the recording medium are accommodated in a stacked state in the paper accommodating case 115. The paper feed roller 145 has a role in feeding out one by one the printing papers P accommodated in the paper accommodating case 115 toward the transport unit 120.

In the present embodiment, two pairs of feed rollers 118a and 118b, and 119a and 119b are disposed along a transport path for the printing papers P between the paper feed unit 114 and the transport unit 120. The printing paper P fed out of the paper feed unit 114 is guided into the transport unit 120 by the feed rollers 118a and 118b and the feed rollers 119a and 119b.

The transport unit 120 includes a transport belt 111, belt rollers 106 and 107, a transport motor 174, and nip rollers 138 and 139.

The transport belt 111 has a role in transporting the printing paper P fed out of the paper accommodating case to 115 the liquid discharge head 2. The transport belt 111 is entrained around the belt rollers 106 and 107. The transport belt 111 is stretched without looseness along two planes parallel to each other which respectively include common tangents of the belt rollers 106 and 107. The liquid discharged head 2 is disposed oppositely to one of these two planes. Therefore, a surface of the transport belt 111 which faces the liquid discharge head 2 serves as a transport surface 127 along which the printing paper P is transported.

The transport motor 174 has a role in moving the transport belt 111. The transport motor 174 is connected to the belt roller 106. The transport motor 174 is capable of rotating the belt roller 106 in an arrowed direction A. The belt roller 107 is rotatable interlockingly with the transport belt 111. Accordingly, the transport belt 111 is movable along the arrowed direction A by causing the belt roller 106 to rotate by the transport motor 174.

The nip rollers 138 and 139 have a role in securely attaching the printing paper P onto the transport surface 127. The nip rollers 138 and 139 are disposed oppositely to each other with the transport surface 127 interposed therebetween. The nip rollers 138 and 139 are rotated interlockingly with movement of the transport belt 111. Here, the printing paper P fed from the paper feed unit 114 to the transport unit 120 is nipped between the nip roller 138 and the transport surface 127. This ensures that the printing paper P is securely attached to the transport surface 127 by being pressed against the transport surface 127 of the transport belt 111. The printing paper P is then transported to the liquid discharge head 2 according to the movement of the transport belt 111.

The liquid discharge head 2 has a role in discharging a liquid onto the printing paper P. The liquid discharge head 2 is disposed oppositely to the transport surface 127. Specifically, the liquid discharge head 2 has a head body 2a. The head body 2a lies closer to the transport surface 127. The configuration of the liquid discharge head 2 is described in detail later.

In the present embodiment, liquid drops (inks) of four colors are to be discharged from the head body 2a. For example, magenta (M), yellow (Y), cyan (C), and black (K) are employable as these four colors. The printing paper P that is already transported from the paper feed unit 114 to the transport unit 120 then passes through a clearance between the liquid discharged head 2 and the transport surface 127 of the transport belt 111. On that occasion, the liquid drops are to be discharged from the head body 2a to the printing paper P. Consequently, a color image on the basis of image data stored by the control section 100 is formed on the printing paper P. The printing paper P having the image formed thereon is then fed out to the paper receiving part 116.

In the present embodiment, a peel-off plate 140 and two pairs of feed rollers 121a and 121b, and 122a and 122b are disposed between the transport unit 120 and the paper receiving part 116. The printing paper P having the color image printed thereon is then transported to the peel-off plate 140 by the transport belt 111. The printing paper P is then fed out to the paper receiving part 116 by the feed rollers 121a to 122b.

The paper receiving part 116 has a role in accommodating the printing paper P fed out of the transport unit 120. The paper receiving part 116 is disposed in a transport direction of the printing paper P fed out of the transport unit 120.

In the present embodiment, a paper surface sensor 133 is disposed between the liquid discharge head 2 and the nip roller 138. The paper surface sensor 133 has a role in detecting positional information about the printing paper P transported on the transport surface 127. The paper surface sensor 133 has a light-emitting element and a light-receiving element. The positional information about the printing paper P detected by the paper surface sensor 133 is to be transmitted to the control section 100. The control section 100 controls, for example, the liquid discharge head 2 or the transport motor 174 on the basis of a detection result received from the paper surface sensor 133. This makes it possible to synchronize a transport of the printing paper P and printing of the image.

Figure 3:
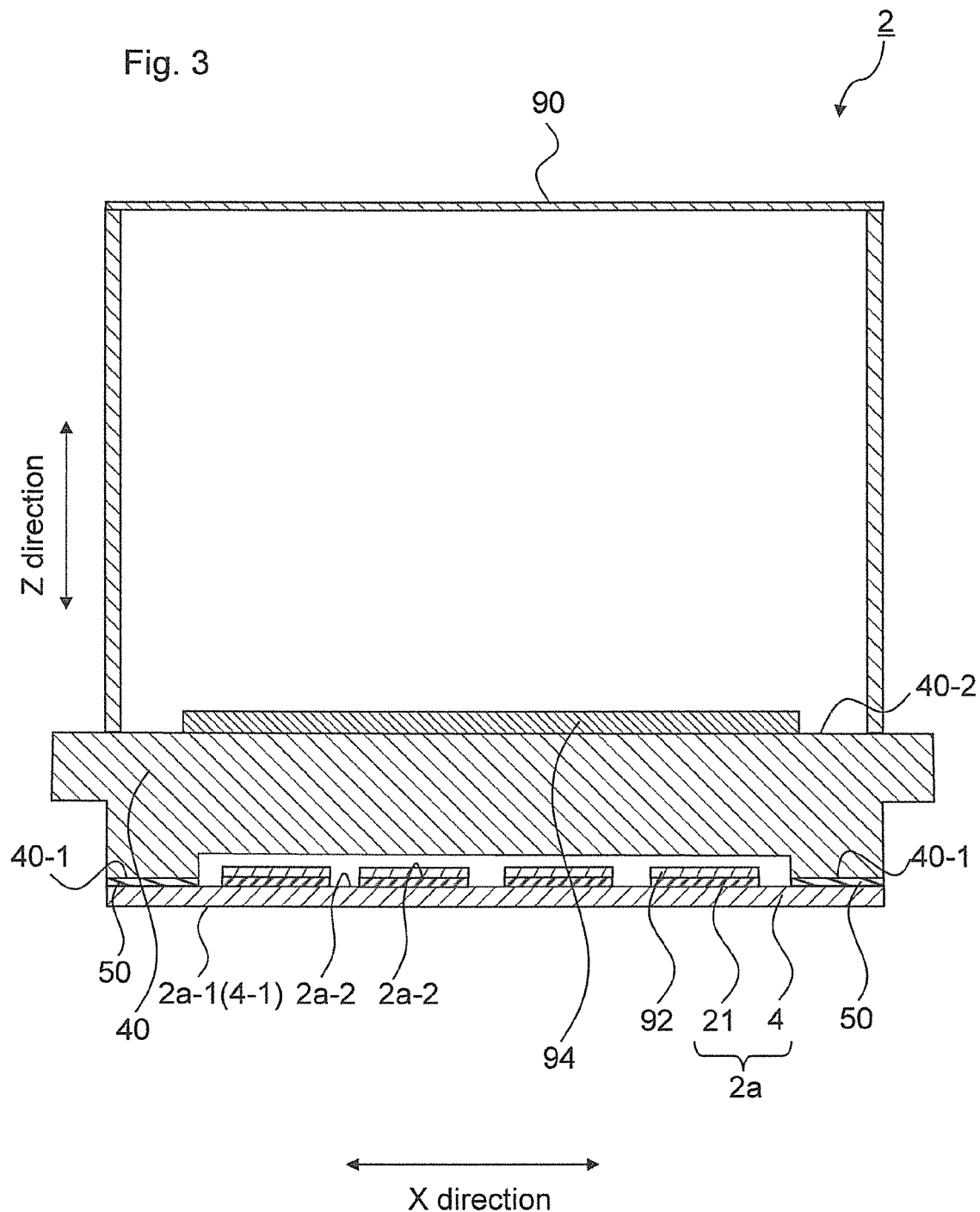
FIG. 3 is a sectional view in a longitudinal direction of the liquid discharge head according to the embodiment.

A configuration of the liquid discharge head 2 is schematically described below with reference to FIGS. 2 to 4. FIG. 2 is a perspective view schematically showing a configuration of the liquid discharge head 2. FIG. 3 is a sectional view in a longitudinal direction (X direction in FIG. 2) of the liquid discharge head 2 according to the present embodiment. FIG. 4 is a sectional view in a transverse direction (Y direction in FIG. 2) of the liquid discharge head 2. In FIGS. 3 and 4, illustration of flow channels in the flow channel member 4 and a reservoir 40 is omitted for the sake of description.

As shown in FIGS. 2 to 4, the liquid discharge head 2 includes the head body 2a, the reservoir 40, a first adhesive member 50, a housing 90, a wiring substrate 94, a connector 95, a flexible wiring substrate 92, a driver IC 55, a pressing plate 96, and a heat insulating elastic member 97.

The head body 2a has a first major surface 2a-1 (a discharge hole surface 4-1) of the head body 2a, which has a discharge hole 8 disposed thereon, and a second major surface 2a-2 of the head body 2a, which lies opposite the first major surface 2a-1. The piezoelectric actuator substrate 21 is disposed on the second major surface 2a-2 of the head body 2a. The head body 2a has a role in performing a predetermined printing on the recording medium by discharging the liquid drops from the discharge hole surface 2a-1 of the flow channel member 4 according to displacement of the piezoelectric actuator substrate 21.

A relationship between these surfaces is organized as follows. The surface of the flow channel member 4 having the discharge hole 8 disposed thereon is the discharge hole surface 4-1. The surface of the flow channel member 4 opposite the discharge hole surface 4-1 is a pressurizing chamber surface 4-2 having thereon a pressurizing chamber 10 described later. The surface of the head body 2a which has the discharge hole 8 thereon is the first major surface 2a-1, and is identical to the discharge hole surface 4-1. The surface of the head body 2a opposite the first major surface 2a-1 is the second major surface 2a-2. The second major surface 2a-2 is the surface including a part of the pressurizing chamber surface 4-2 which is not covered with the piezoelectric actuator substrate 21, and a major surface of the piezoelectric actuator substrate 21. The second major surface 2a-2 is the surface having irregularities by an amount equivalent to a thickness of the piezoelectric actuator substrate 21.

The reservoir 40 as a supply part has a role in supplying a liquid to the flow channel member 4 of the head body 2a. The reservoir 40 is disposed on the head body 2a. The reservoir 40 has a mounting surface 40-1 and an upper surface 40-2. The mounting surface 40-1 is a part of a third major surface of the flow channel member 4 which faces the pressurizing chamber surface 4-2 lying opposite the discharge hole surface 4-1. The mounting surface 40-1 is adhered to the pressurizing chamber surface 4-2 with the first adhesive member 50 interposed therebetween. As the first adhesive member 50, it is possible to use, for example, a high-temperature adhesive member to be cured under temperature conditions of 80-150° C. For example, an epoxy resin is usable as the high-temperature adhesive member. It is also possible to use an adhesive member composed mainly of a phenol resin, a urea resin, a melamine resin, or the like.

A liquid supply channel in the reservoir 40 to supply the liquid to the head body 2a may serve as a damper capable of changing a volume of the liquid supply channel owing to deformation of a part of a wall surface of the liquid supply channel, making it possible to reduce variations in an amount of supply upon a rapid change in an amount of the liquid discharged from the head body 2a.

The housing 90 has a role in accommodating members included in the liquid discharge head 2. The housing 90 accommodates the members included in the liquid discharge head 2 so as to expose at least the discharge hole surface 4-1 of the flow channel member 4 included in the heat body 2a. In the present embodiment, the housing 90 is disposed on the reservoir 40. Therefore, as shown in FIG. 2, at least a part of each of the reservoir 40 and the head body 2a is exposed from the housing 90. The housing 90 also has a housing opening 90a. The housing opening 90a is disposed by opening a part of the housing 90 which lies on the upper surface 40-2 of the reservoir 40. For example, the liquid discharge head 2 is capable of supplying, through the housing opening 90a, electric power to the wiring substrate 94, or the liquid to the reservoir 40. As a constituent material of the housing 90, there is, for example, a metal material or a resin material. As described later, the housing 90 is not necessarily needed because the individual electrodes 25 and portions for electrically connecting the individual electrodes 25 and the flexible wiring substrate 92 are sealed with a second adhesive member 60.

The wiring substrate 94 has a role in receiving a driving signal transmitted from the control section 100 when the liquid discharge head 2 is incorporated into the printer 1. The wiring substrate 94 is disposed on the upper surface 40-2 of the reservoir 40. A connector 95 is mounted on the wiring substrate 94. As the wiring substrate 94, it is possible to use, for example, one having various kinds of electronic components on a resin substrate or a ceramic substrate.

The flexible wiring substrate 92 has a role in electrically connecting the piezoelectric actuator substrate 21 and the connector 95. The driver IC 55 is mounted on the flexible wiring substrate 92. As the flexible wiring substrate 92, it is possible to use, for example, a conventionally well-known flexible printed wiring board.

In the liquid discharge head 2, the wiring substrate 94 transmits the driving signal received from the control section 100 to the flexible wiring substrate 92. Subsequently, the driver IC 55 mounted on the flexible wiring substrate 92 applies predetermined processing to the driving signal, and transmits the driving signal after being processed to the piezoelectric actuator substrate 21. Then, the piezoelectric actuator substrate 21 is displaced according to the driving signal after being processed, thereby causing the liquid drops to be discharged from the discharge hole surface 4-1 of the flow channel member 4. Thus, the predetermined printing is performable on the recording medium by using the liquid drops discharged from the discharge hole surface 4-1.

The number of each of the wiring substrate 94 and the driver IC 55 to be mounted is not particularly limited, but is suitably changeable according to a use form of the liquid discharge head 2. Alternatively, the wiring substrate 94 may be omitted. For example, the control section 100 and the flexible wiring substrate 92 may be directly electrically connected to each other.

The pressing plate 96 has a role in pressing the driver IC 55 against the housing 90. The pressing plate 96 is disposed on the reservoir 40. The heat insulating elastic member 97 is secured to the pressing plate 96. The pressing plate 96 presses the driver IC 55 against the housing 90 with the heat insulating elastic member 97 and the flexible wiring substrate 92 interposed therebetween. This makes it possible to transfer heat generated in the driver IC 55 to the housing 90, thereby releasing the heat outside the liquid discharge head 2.

The constituent material of the housing 90 is preferably a material having a relatively large thermal conductivity in order to efficiently release the heat outside the liquid discharge head 2. Specifically, the constituent material of the housing 90 is preferably, for example, a metal material.

In the present embodiment, the flexible wiring substrate 92 is curvedly disposed in the housing 90. Hence, force trying to return from a curved state to an ordinary state acts on the flexible wiring substrate 92. The driver IC 55 is to be more strongly pressed against the housing 90 by the force. This makes it easier to transfer the heat generated in the driver IC 55 to the housing 90.

The head body 2a is described in detail below with reference to FIGS. 5 to 7 in addition to FIGS. 2 to 4.

Figure 5A:
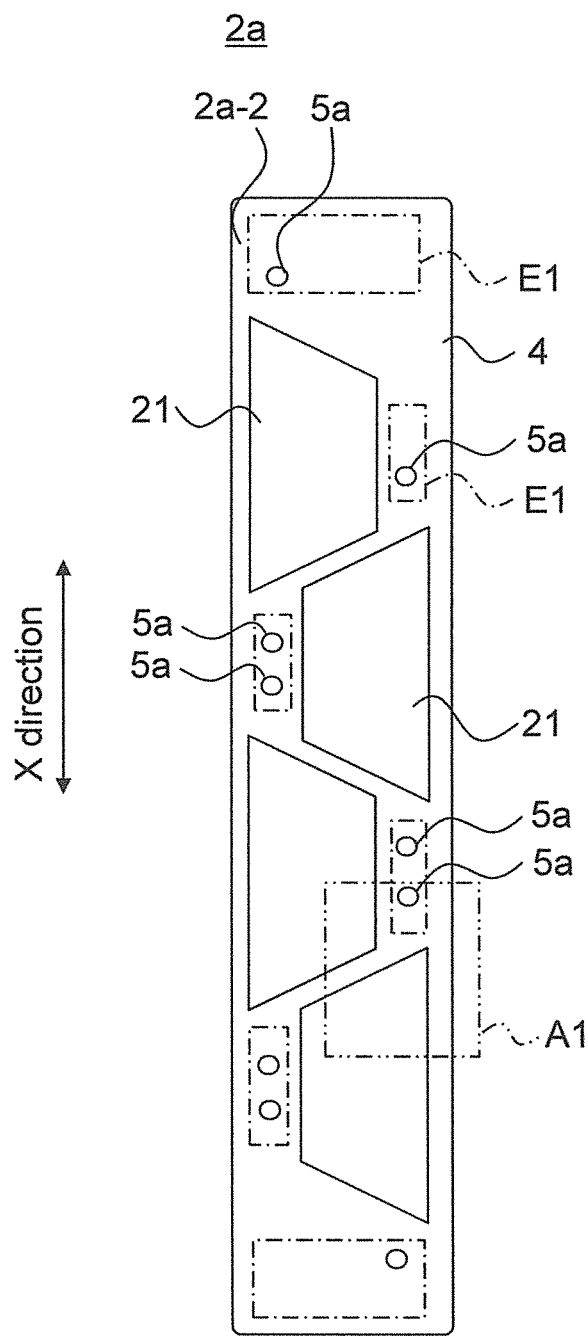
FIG. 5(a) is a plan view schematically showing a configuration of a head body according to the embodiment.
Figure 5B:
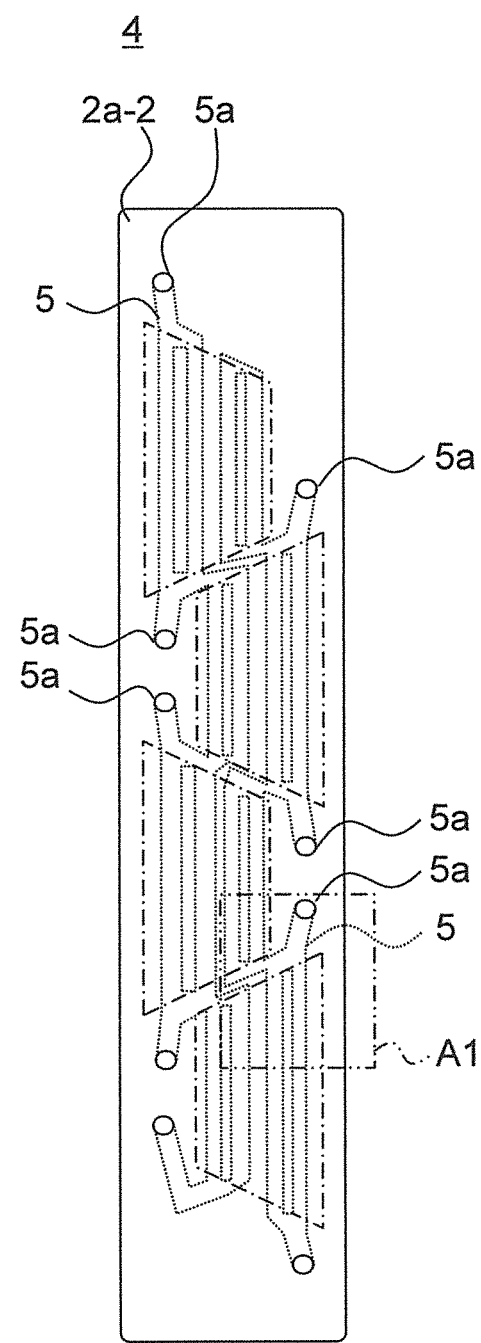
FIG. 5(b) is a plan view schematically showing a configuration of a flow channel member according to the embodiment.

FIG. 5(a) is a plan view schematically showing a configuration of the head body 2a. FIG. 5(b) is a plan view schematically showing a configuration of the flow channel member 4. In FIG. 5(b), a region on which the piezoelectric actuator substrate 21 lies is indicated by one-dot chain line. FIG. 5 omits illustration of a first through hole 60 for the sake of description. FIG. 6 is an enlarged view of a region A1 surrounded by two-dot chain line in FIG. 5. The pressurizing chamber 10 and an individual flow channel 12 shown in FIG. 6 are indicated by solid line for the sake of description. FIG. 7 is a sectional view taken along line I-I in FIG. 6.

The head body 2a includes the piezoelectric actuator substrate 21 and the flow channel member 4. In the present embodiment, the head body 2a has an approximately rectangular shape that extends in the X direction in a plan view, without limitation thereto. The shape of the head body 2a is suitably changeable according to the use form of the liquid discharge head 2.

The piezoelectric actuator substrate 21 has an approximately trapezoidal shape in a plan view. In the present embodiment, as shown in FIG. 6, acute angles of the trapezoidal shape of the piezoelectric actuator substrate 21 in the plan view are cut off. Although the piezoelectric actuator substrate 21 therefore has a hexagonal shape in the plan view, a side corresponding to the acute angle thus cut off is extremely shorter than other side, thereby leading to the approximately trapezoidal shape. Four piezoelectric actuator substrates 21 are disposed on the pressurizing chamber surface 4-2 of the flow channel member 4. Specifically, the four piezoelectric actuator substrates 21 are disposed side by side in two rows and in a zigzag form along the X direction. Opposing oblique sides of the two piezoelectric actuator substrates 21 adjacent to each other lie overlappingly in Y direction.

In FIG. 5(a), a mounting region E1 of the pressurizing chamber surface 4-2 of the flow channel member 4 which is overlapped with the mounting surface 40-1 of the reservoir 40 is indicated by one-dot chain line. Two mounting regions E1 are disposed at each of both ends of the pressurizing chamber surface 4-2 in the X direction, and four mounting regions E1 are disposed correspondingly to the four piezoelectric actuator substrates 21. The mounting regions E1 corresponding respectively to the piezoelectric actuator substrates 21 are disposed side by side with the piezoelectric actuator substrates 21 in the Y direction. Specifically, the mounting regions E1 corresponding respectively to the piezoelectric actuator substrates 21 lie oppositely to short sides of the piezoelectric actuator substrates 21 having the approximately trapezoidal shape in the plan view. Except for the mounting regions E1, the four piezoelectric actuator substrates 21 lie in a space between the pressurizing chamber surface 4-2 of the flow channel member 4 and the reservoir 40.

The shape of the piezoelectric actuator substrate 21 in the plan view or the number thereof are optional and suitably changeable according to the use form of the liquid discharge head 2. For example, the single piezoelectric actuator substrate 21 may be disposed and may have an approximately rectangular shape smaller than the second major surface 2a-2 of the head body 2a in a plan view. In this case, for example, two mounting regions E1 may be respectively disposed at both end portions of the second major surface 2a-2 of the head body 2a in the X direction, and the piezoelectric actuator substrate 21 may be disposed between these two mounting regions E1.

Alternatively, the piezoelectric actuator substrate 21 may be disposed on a surface of the flow channel member 4 other than the pressurizing chamber surface 4-2 so as to be capable of pressurizing each of a plurality of the pressurizing chambers 10.

The piezoelectric actuator substrate 21 includes piezoelectric ceramic layers 21a and 21b, a common electrode 24, the individual electrodes 25, a connection electrode 26, a dummy connection electrode 27, and a surface electrode 28 for the common electrode.

The piezoelectric ceramic layer 21a has a role as a diaphragm. The piezoelectric ceramic layer 21a covers a plurality of holes formed in a cavity plate 4a on the pressurizing chamber surface 4-2. The holes covered by the piezoelectric ceramic layer 21a are the holes constituting the pressurizing chambers 10. That is, the pressurizing chambers 10 are formed so as to be surrounded by the piezoelectric ceramic layer 21a and the cavity plate 4a. The common electrode 24 is disposed on nearly the entire surface of the piezoelectric ceramic layer 21a. The piezoelectric ceramic layer 21b is disposed on nearly the entire surface of the common electrode 24. A plurality of individual electrodes 25 are disposed correspondingly to the pressurizing chambers 10 on the piezoelectric ceramic layer 21b. Specifically, each of the individual electrodes 25 includes an individual electrode body 25a disposed so as to overlap with the pressurizing chamber 10 in the plan view, and an extraction electrode 25b disposed so as not to overlap with the pressurizing chamber 10.

The common electrode 24 is electrically connected to the flexible wiring substrate 92 via a surface electrode 28 for the common electrode (not shown) disposed on the piezoelectric ceramic layer 21b. The individual electrode body 25a is electrically connected to the flexible wiring substrate 92 via the connection electrode 26 disposed on the extraction electrode 25b. In the present embodiment, the dummy electrode 27 is disposed on the piezoelectric ceramic layer 21b. This makes it possible to improve electrical connection reliabilities between the flexible wiring substrate 92 and the surface electrode 28 for the common electrode, and between the flexible wiring substrate 92 and the connection electrode 26. A connection structure of the piezoelectric actuator substrate 21 and the flexible wiring substrate 92 is described in detail below.

Examples of constituent materials of the piezoelectric ceramic layers 21a and 21b include lead zirconate titanate and barium titanate. Examples of constituent materials of the common electrode 24, the individual electrode 25, the connection electrode 26, the dummy connection electrode 27, and the surface electrode 28 for the common electrode include Au, Ag, Pd, Ag—Pd, Pt, Ni, and Cu. Examples of a method for forming the piezoelectric actuator substrate 21 includes the following methods. That is, with a tape forming method, such as roll coater method or slit coater method, a tape composed of piezoelectric ceramic powder and an organic composition is formed to produce a plurality of green sheets that are respectively fired into the piezoelectric ceramic layers 21a and 21b. An electrode paste serving as the common electrode 24 is formed on a surface of each of these green sheets by printing method or the like. A via hole is formed in a part of these green sheets, and a via conductor is loaded into the via hole. Thereafter, these green sheets are laminated one upon another to produce a laminated body, followed by adhesion under pressure. The laminated body subjected to the adhesion under pressure is then fired in a high oxygen concentration atmosphere. An electrode paste that becomes the individual electrode 25 and the connection electrode 26 is formed by printing method or the like, followed by firing. This results in the piezoelectric actuator substrate 21.

Figure 7:
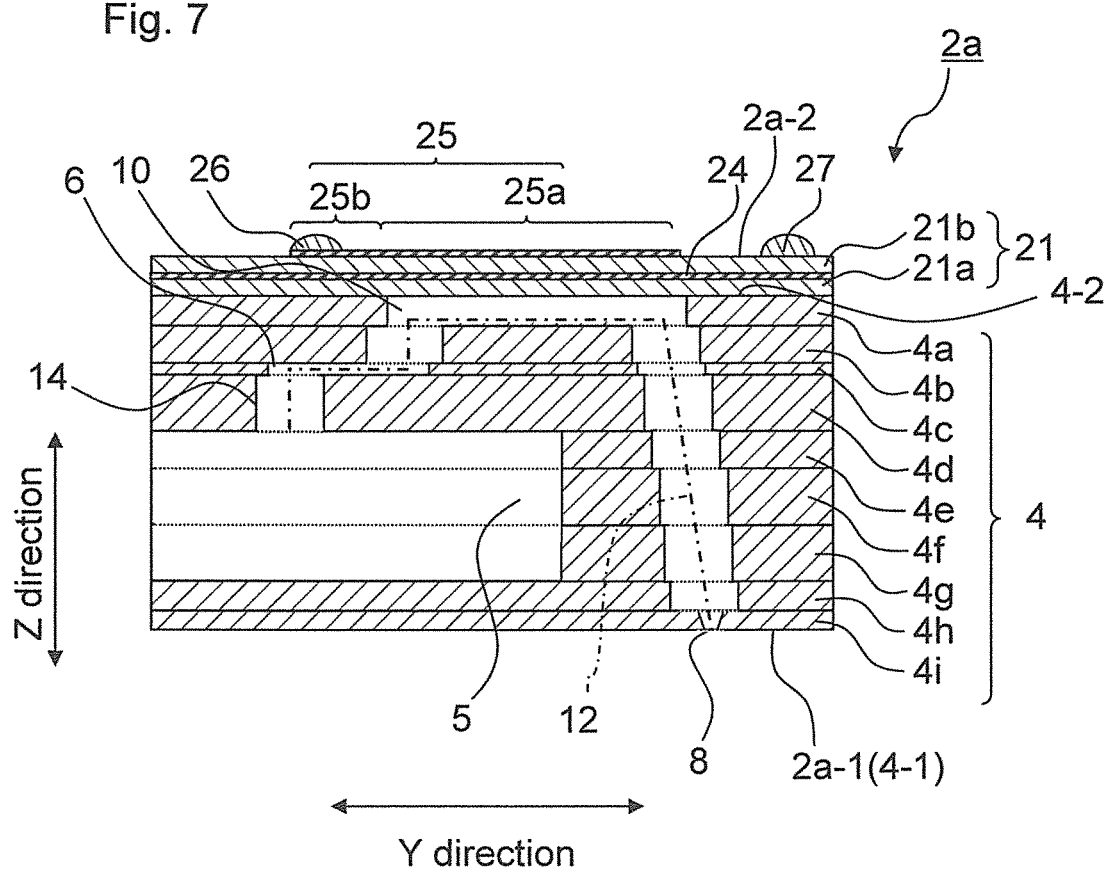
FIG. 7 is a sectional view taken along line I-I in FIG. 6.

The flow channel member 4 has a laminate structure having a plurality of plates laminated one upon another as shown in FIG. 7. Specifically, the flow channel member 4 is formed by sequentially laminating the cavity plate 4a, the base plate 4b, the aperture plate 4c, a supply plate 4d, manifold plates 4e to 4g, a cover plate 4h, and a nozzle plate 4i. A lower surface of the nozzle plate 4i is a discharge hole surface 4-1 configured to form a discharge hole 8 therein. An upper surface of the cavity plate 4a is a pressurizing chamber surface 4-2 configured to dispose the piezoelectric actuator substrate 21 thereon.

Examples of constituent materials of the plates 4a to 4i include metal materials, stainless steel, and silicon. Particularly, examples of the constituent material of the nozzle plate 4i include stainless steel, nickel, polyimide, and silicone. The flow channel member 4 is formed by allowing, for example, the plates 4a to 4i to adhere to one another via a high-temperature adhesive member (not shown) that is cured under temperature conditions of 80-150° C. Examples of the high-temperature adhesive member include one similar to the first adhesive member 50. A thickness of each of the plates 4a to 4i is settable to, for example, 10-300 μm.

A large number of holes are formed on the plates 4a to 4i. These holes constitute the manifold 5, the individual flow channel 12, the discharge hole 8, and the first through hole 7 in the present embodiment. These holes are formed by carrying out etching to a predetermined portion of each of the plates 4a to 4i.

The manifold 5 has a role in supplying the liquid to the individual flow channel 12. The manifold 5 is made up of a plurality of holes communicating with each other which are formed in the plates 4a to 4g. Specifically, a supply hole 5a for supplying the liquid to the flow channel member 4 is formed in the second major surface 2a-2 of the head body 2a. There are a plurality of the supply holes 5a in the mounting region E1 of the mounting surface 40-1 of the reservoir 40. That is, the liquid is to be supplied from a liquid supply channel of the reservoir 40 (not shown) to the flow channel member 4 via the supply hole 5a in the mounting region E1. The supply holes 5a is communicated with the holes formed in the manifold plates 4e to 4h via the holes formed in the plates 4a to 4d. The holes formed in the manifold plates 4e to 4h constitute a major flow channel of the manifold 5, and extend in a plurality of branch flow channels in the X direction. The supply holes 5a is communicated with each other via these branch flow channels.

The individual flow channel 12 is a flow channel through which the liquid supplied from the manifold 5 is introduced into the discharge hole 8. Specifically, the individual flow channel 12 indicates a flow channel extending from the manifold 5 to the discharge hole 8 via the individual supply channel 14, the aperture 6, and the pressurizing chamber 10.

The individual supply channel 14 is composed of the holes formed in the supply plate 4d. There are a plurality of the individual supply channels 14. The individual supply channels 14 are respectively communicated with the manifold 5. Therefore, the liquid accommodated in the manifolds 5 are to be individually supplied to the discharge holes 8 via the individual supply channels 14.

The aperture 6 has a role in reducing the possibility that the liquid accommodated in the pressurizing chamber 10 flows back into the manifold 5 when the pressurizing chamber 10 is pressurized. Therefore, a cross-sectional area of a flow channel in the aperture 6 is smaller than a cross-sectional area of a flow channel extending between the pressurizing chamber 10 and the discharge hole 8. The aperture 6 is composed of the hole formed in the aperture plate 4c. The aperture 6 is communicated with the individual supply channel 14. Therefore, a plurality of the apertures 6 are respectively disposed correspondingly to the individual supply channels 14.

The pressurizing chamber 10 has a role in supply the liquid accommodated in the pressurizing chamber 10 to the discharge hole 8 by being pressurized by the piezoelectric actuator substrate 21. The pressurizing chamber 10 is composed of the hole formed in the cavity plate 4a. The pressurizing chamber 10 is disposed so as to overlap with the individual electrode body 25a in the plan view. More specifically, the entirety of the individual electrode body 25a lies within a region on which the pressurizing chamber 10 lies in the plan view. FIG. 6 shows only some of the individual electrode bodies 25a for the sake of description. The pressurizing chamber 10 is communicated with the aperture 6 via the hole formed in the base plate 4b. Therefore, a plurality of the pressurizing chambers 10 are respectively disposed correspondingly to the apertures 6.

Figure 6:
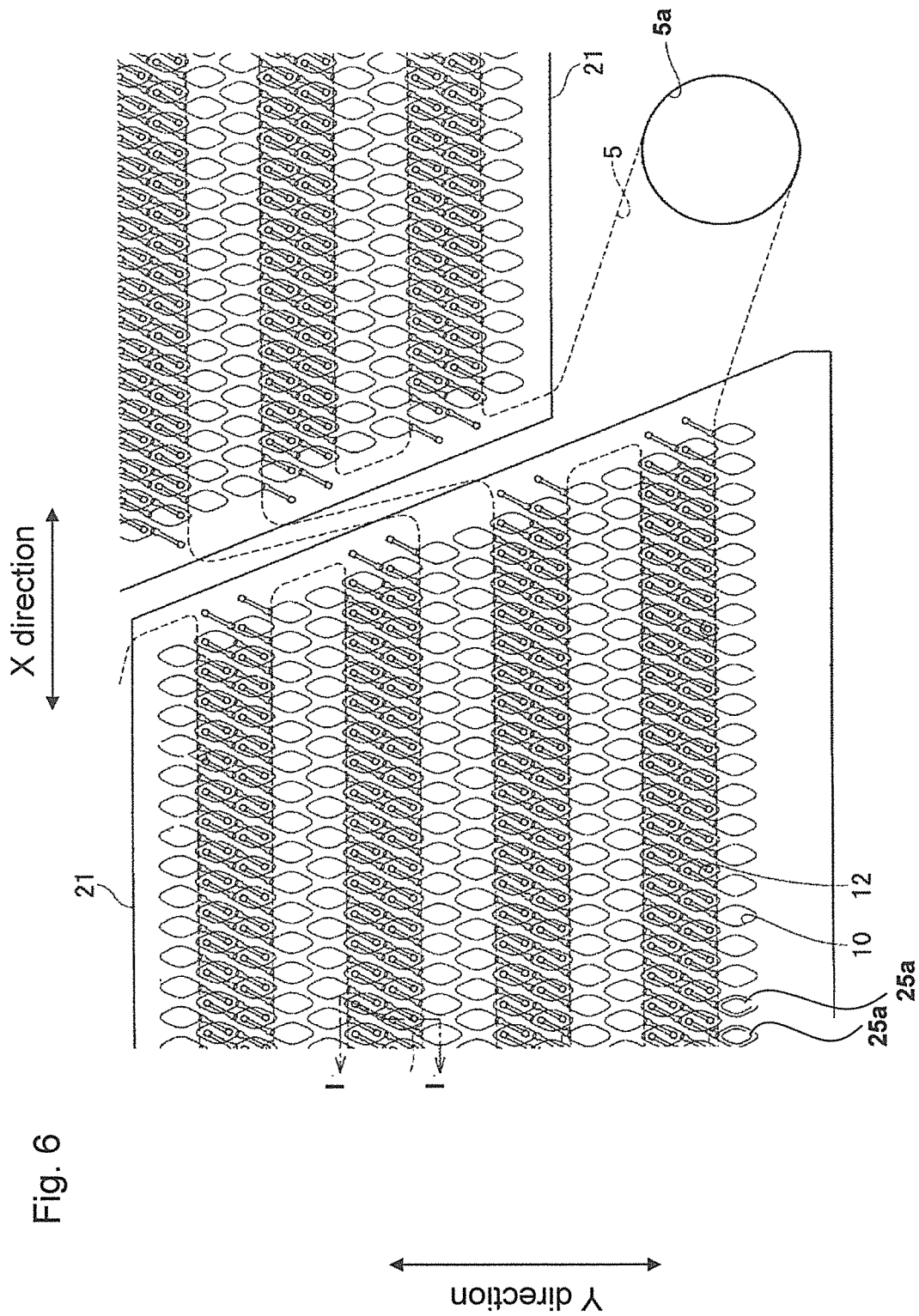
FIG. 6 is an enlarged view of a region A1 surrounded by two-dot chain line in FIG. 5, with some components omitted for the sake of description.

The pressurizing chamber 10 has an approximately rhombus shape whose corners are rounded in a plan view as shown in FIG. 6. The pressurizing chambers 10 are disposed in a zigzag form. The pressurizing chambers 10 are also disposed in a row in X direction. In the present embodiment, 16 rows of the pressurizing chambers 10 disposed in the row in the X direction among a group of the pressurizing chambers 10 corresponding to the single piezoelectric actuator substrate 21 are disposed in Y direction.

The discharge hole 8 has a role in allowing the liquid supplied from the pressurizing chamber 10 to be discharged outside. The discharge hole 8 is formed by allowing the hole formed in the nozzle plate 4i to open into the discharge hole surface 4-1. The discharge hole 8 is communicated with the pressurizing chamber 10 via a plurality of holes formed in the base plate 4b, the aperture plate 4c, the supply plate 4d, the manifold plates 4e to 4g, the cover plate 4h, and the nozzle plate 4i. Therefore, a plurality of the discharge holes 8 are respectively disposed correspondingly to the pressurizing chambers 10.

The number and arrangement of the pressurizing chambers 10 and the discharge holes 8 are optional and suitably changeable according to the use form of the liquid discharge head 2.

Thus, in the liquid discharge head 2, the piezoelectric ceramic layer 21b is displaced according to the driving signal transmitted from the flexible wiring substrate 92 to the common electrode 24 and to the individual electrode 25. The piezoelectric ceramic layer 21a applies a predetermined pressure to the pressurizing chamber 10 by being curved toward the pressurizing chamber 10 according to the displacement of the piezoelectric ceramic layer 21b. Consequently, the liquid accommodated in the pressurizing chamber 10 is discharged from the discharge hole 8.

The flow channel member 4 further has a first through hole 7 provided by allowing the holes respectively formed in the cavity plate 4a and the base plate 4b to communicate with each other. A connection structure between the piezoelectric actuator substrate 21 and the flexible wiring substrate 92 is described in detail below with reference to FIGS. 8 and 9 in addition to FIGS. 1 to 7.

Figure 8A:
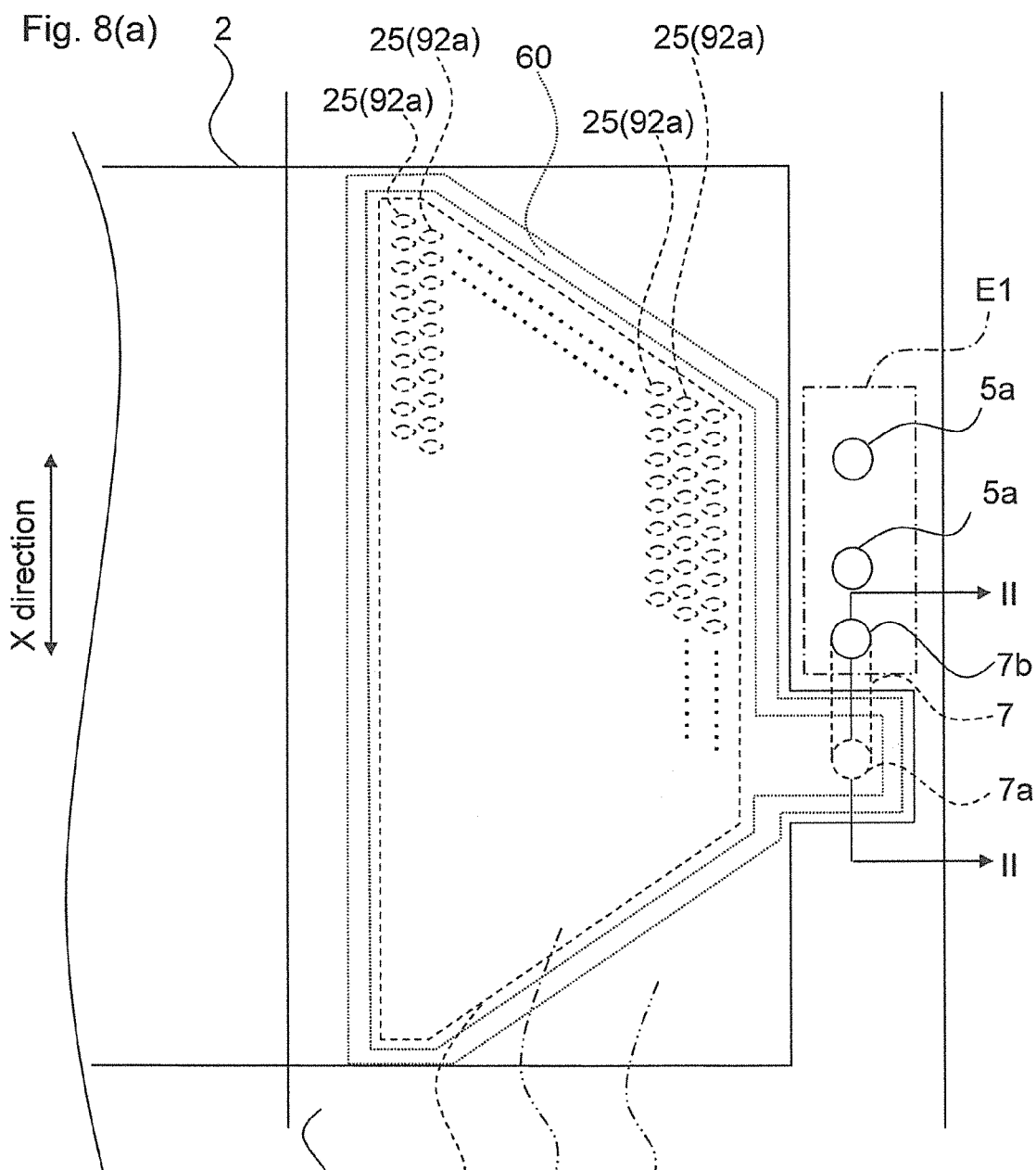
FIG. 8(a) is a plan view showing the head body and a flexible wiring substrate according to the embodiment, with some components omitted for the sake of description.
Figure 8B:
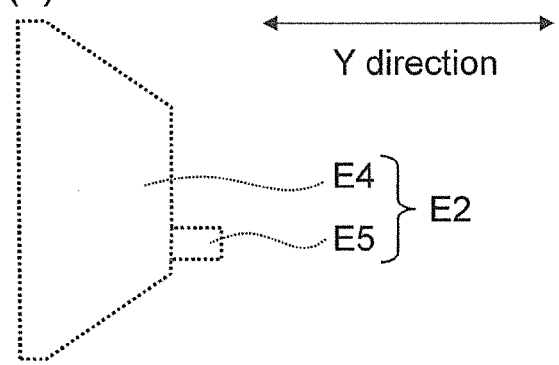
FIG. 8(b) is a plan view of a first region in an identical region.
Figure 9:
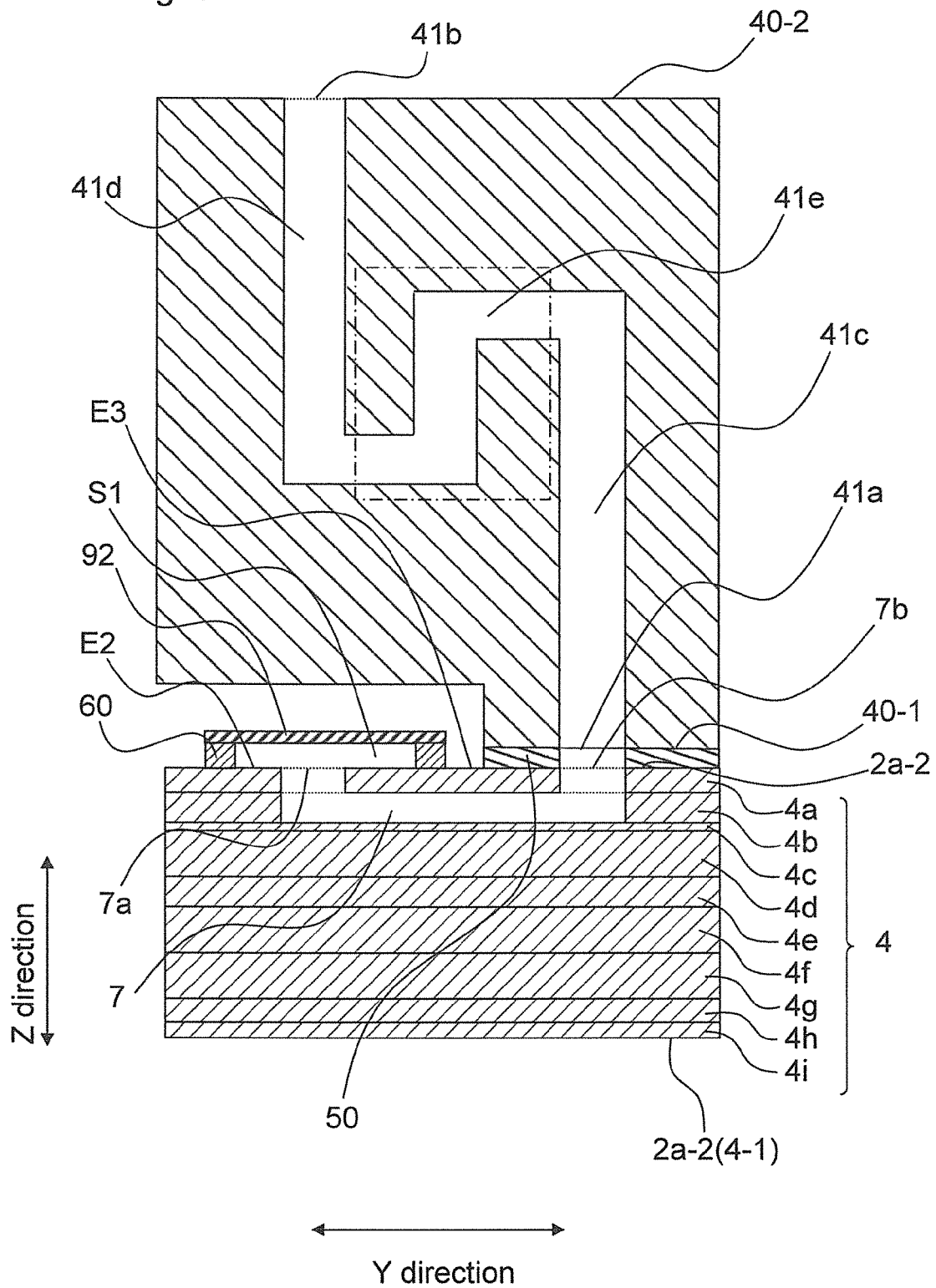
FIG. 9 is a sectional view taken along line II-II in FIG. 8.

FIG. 8(a) is a plan view showing the connection structure between the piezoelectric actuator substrate 21 and the flexible wiring substrate 92. For the sake of description, FIG. 8(a) merely shows a single piezoelectric actuator substrate 21, the flexible wiring substrate 92, the flow channel member 4, and the second adhesive member 60, each of which corresponds to the single piezoelectric actuator substrate 21. FIG. 8(b) is a plan view of a first region in the same region as in FIG. 8(a). FIG. 9 is a sectional view taken along line II-II in FIG. 8, and shows the first adhesive member 50 and the reservoir 40 in addition to the members shown in FIG. 8(a).

As shown in FIGS. 8 and 9, the flexible wiring substrate 92 is located so as to cover the single piezoelectric actuator substrate 21 in a plan view. In the present embodiment, though four flexible wiring substrates 92 are respectively disposed correspondingly to four piezoelectric actuator substrates 21, without limitation thereto, a single flexible wiring substrate 92 may be disposed correspondingly to these four piezoelectric actuator substrates 21. The flexible wiring substrate 92 is not overlapped with the mounting region E1 in the plan view.

The flexible wiring substrate 92 has a plurality of lands 92a. The lands 92a are respectively electrically connected to the individual electrodes 25. Specifically, the lands 92a are connected to the connection electrode 26 disposed on the extraction electrode 25b of the individual electrode 25. The lands 92a are connected to a plurality of wiring lines (not shown) included in the flexible wiring substrate 92, and these wiring lines are connected to a wiring substrate 94. Thus, the flexible wiring substrate 92 supplies a driving signal to each of the individual electrodes 25.

The second adhesive member 60 is disposed between the second major surface 2a-2 of the head body 2a (more specifically, the pressurizing chamber surface 4-2 of the flow channel member 4) and the flexible wiring substrate 92. The second adhesive member 60 adheres the second major surface 2a-2 of the head body 2a and the flexible wiring substrate 92. The second adhesive member 60 is disposed so as to surround the piezoelectric actuator substrate 21 in the plan view. Here, a surface of the head body 2a surrounded by the second adhesive member 60 is taken as a first region E2, and a surface of the head body 2a other than the first region E2 is taken as a second region E3. The individual electrodes 25 lie in a space S1 surrounded by the first region E2, the flexible wiring substrate 92, and the second adhesive member 60. It is therefore possible to reduce the possibility that, for example, when a liquid enters on the second major surface 2a-2 of the head body 2a from between the housing 90 and the flow channel member 4, or along an inner wall of the housing 90, the liquid comes into contact with the individual electrodes 25. Additionally, the individual electrodes 25 face the space S1, and hence, displacement generated upon application of a voltage is less suppressible by the second adhesive member 60.

In the present embodiment, the second adhesive member 60 adheres the pressurizing chamber surface 4-2 and the flexible wiring substrate 92, without limitation thereto, may adhere the piezoelectric actuator substrate 21 and the flexible wiring substrate 92.

Specifically, there are the case where the space S1 is surrounded by the piezoelectric actuator substrate 21, the pressurizing chamber surface 4-2, the flexible wiring substrate 92, and the second adhesive member 60, and the case where the space S1 is surrounded by the piezoelectric actuator substrate 21, the flexible wiring substrate 92, and the second adhesive member 60. In the former case, the second adhesive member 60 is disposed so as to reach a position closer to the individual electrodes 25 than the present embodiment in the plan view. Similarly to the present embodiment, the space S1 is drawn out to the pressurizing chamber surface 4-2, and is communicated with the first through hole 7 that opens into the pressurizing chamber surface 4-2 at a drawn-out location. In the latter case, the second adhesive member 60 is disposed on the piezoelectric actuator substrate 21 in the plan view, and the space S1 is communicated with the first through hole 7 that opens into the piezoelectric actuator substrate 21. In this case, the first through hole 7 passing through the piezoelectric actuator substrate 21 may pass through the piezoelectric actuator substrate 21 in Z direction so as to communicate with the first through hole 7 passing through the flow channel member 4. Alternatively, the first through hole 7 passing through the piezoelectric actuator substrate 21 may extend toward the flow channel member 4 in the Z direction, and then extend in a plane direction (the X direction, the Y direction, or a direction between these two directions) so as to open into a side surface of the piezoelectric actuator substrate 21, or may extend in the plane direction and then extend away from the flow channel member 4 in the Z direction so as to open into the second major surface 2a-2 of the head body 2a. The first through hole 7 extending in the plane direction may be disposed inside the piezoelectric actuator substrate 21, or may be a groove of the piezoelectric actuator substrate 21, a groove of the flow channel member 4, or one obtainable by combining these grooves.

Either of these configurations is capable of reducing the possibility that a plurality of the individual electrodes 25 and the liquid come into contact with each other, as long as the second adhesive member 60 surrounds the plurality of individual electrodes 25 in the plan view.

Examples of a constituent material of the second adhesive member 60 include silicone resins and epoxy resins. For example, an adhesive member composed mainly of a phenol resin, urea resin, melamine resins, or the like may be used as the second adhesive member 60. Examples of a method of forming the second adhesive member 60 include a method of applying the second adhesive member 60 using a dispenser, a method of transferring the second adhesive member 60 onto the pressurizing chamber surface 4-2 by screen printing, and a method of previously applying the second adhesive member 60 onto the flexible wiring substrate 92, followed by adhesion onto the pressurizing chamber surface 4-2.

Taking it into consideration vibration of the corresponding pressurizing chamber 10 (the liquid therein) when driving the individual electrode 25 disposed at a position near the second adhesive member 60, due to the presence of the second adhesive member 60, rigidity in the periphery of the second adhesive member 60 differs from rigidity in the periphery of other pressurizing chamber 10. This may cause a difference in vibrational state therebetween. The influence thereof can be reduced by making a setting so that, in the plan view, a distance between the pressurizing chamber 10 closest to the second adhesive member 60 and the second adhesive member 60 is not less than a diameter of a circle obtained by converting an area of the pressurizing chamber 10 into a circle (the diameter of the circle having the same area as the area of the pressurizing chamber 10). Some of the pressurizing chambers 10 may be the pressurizing chambers 10 actually used for discharge, and some of them may be dummy pressurizing chambers 10 not used for discharge. The dummy pressurizing chamber 10 is, for example, disposed further outside the pressurizing chamber 10 used for discharge in order to, for example, approximate the rigidity in the periphery of the pressurizing chamber 10, which is disposed at an outermost side among the pressurizing chambers 10 used for discharge, to the rigidity in other pressurizing chamber 10. The pressurizing chambers 10 used for discharge among the pressurizing chambers 10 are required to ensure the distance from the second adhesive member 60 as described above, and the dummy pressurizing chambers 10 need not to satisfy the above-mentioned conditions.

In order to prevent the second adhesive member 60 from reaching the location of the pressurizing chamber 10 due to fluctuations during manufacturing processes, the second adhesive member 60 is preferably disposed outside the major surface of the piezoelectric actuator substrate 21. This results in a state in which side surfaces of the piezoelectric actuator substrate 21 stand from the pressurizing chamber surface 4-2.

Therefore, the side surfaces of the piezoelectric actuator substrate 21 make it difficult for the second adhesive member 60 to enter the major surface of the piezoelectric actuator substrate 21.

Alternatively, the second adhesive member 60 may be a resist for the flexible wiring substrate 92. The flexible wiring substrate 92 includes a wiring line electrically connected to the land 92a, and in order to prevent, for example, short-circuit therebetween, the wiring line is disposed between layers of a double-layer resist. The resist close to the piezoelectric actuator substrate 21 is opened at a location where the land 92a is disposed, thereby making it possible to electrically connect the land 92a and the individual electrode 25. The resist for the flexible wiring substrate 92 which is close to the piezoelectric actuator substrate 21 needs to be applied in an uncured state so that the flexible wiring substrate 92 and the head body 2a are adhered to each other with the uncured resist. Thereafter, the resist needs to be cured for enhancing the adhesion. To facilitate the adhesion of the flexible wiring substrate 92 and the head body 2a, the adhesion is preferably carried out to ensure that the corners along the outer periphery of the piezoelectric actuator substrate 21 enter the resist (more preferably, the corners pass through the uncured resist). Instead of using the corners along the outer periphery, a continuous projection may be disposed so as to surround the individual electrodes 25 on the head body 2a so that the projection enters the resist (more preferably, passes through the uncured resist). When, for example, a resin containing silver particles is used as the projection, it is also possible to connect the land 92a and the individual electrode 25 via the projection. In this case, the projection may be electrically connected to the land 92a by previously disposing an opening in the resist. Alternatively, the resist and the projection may be physically connected to each other by allowing the projection to pass through the uncured resist, and then curing the resist.

As described above, the head body 2a has the first through hole 7. The first through hole 7 is disposed independently of the individual flow channel 12. The first through hole 7 has a first opening 7a and a second opening 7b. The first opening 7a opens into the first region E2. In the present embodiment, the flexible wiring substrate 92 and a part of the second adhesive member 60 are protruded so as to lie side by side with the mounting region E1 in the X direction. The first opening 7a opens into the first region E2 overlapping with the flexible wiring substrate 92 thus protruded in the plan view. In other words, the first opening 7a is disposed side by side with the mounting region E1 in the X direction. The second opening 7b opens into the second region E3. In the present embodiment, the second opening 7b opens into the mounting region E1 included in the pressurizing chamber surface 4-2. The second opening 7b lies between the supply hole 5a and the first opening 7a in the X direction.

Thus, the space S1 is communicated with the outside of the flow channel member 4 via the first opening 7a and the second opening 7b of the first through hole 7 in the liquid discharge head 2. This makes it possible to reduce the possibility of a malfunction on the piezoelectric actuator substrate 21.

The first opening 7a is disposed outside a region whose outer edge is the individual electrode 25 disposed at an outermost side among the individual electrodes 25 surrounded by the second adhesive member 60 in the plan view. By so disposing, the individual electrodes 25 can be disposed without increasing a distance therebetween, and hence, the discharge holes 8 can be disposed without increasing a distance therebetween. This makes it possible to minimize deterioration of recording accuracy when a deviation occurs in a mounting angle of the liquid discharge head 2.

The first region E2 includes a third region E4 including all of the individual electrodes 25 surrounded by the second adhesive member 60, and a fourth region E5 protruding from the third region E4 in the plan view. The first opening 7a is disposed in the fourth region E5. As an area of the first region E2 increases, a volume of the space S1 increases, and a volume change of gas in the space S1 when a temperature change occurs also increases. The area of the first region E2 is preferably small in order to prevent, for example, separation of the second adhesive member 60 due to the volume change. The first region E2 and the first opening 7a need to be configured as described above in order not to inhibit displacement due to the individual electrode 25.

More preferably, the first through hole 7 is not disposed in the piezoelectric actuator substrate 21, the through hole 7 is disposed only in the flow channel member 4, and the first opening 7a is disposed in the flow channel member 4. The piezoelectric actuator substrate 21 is preferably a ceramic sintered body. However, when a through hole is made after firing, there are, for example, the problems that a long processing time is necessary, and chipping is apt to occur. When a through hole is made before firing, there is, for example, the problem that deformation is apt to occur in the periphery of the through hole during the firing. Therefore, as described above, it is preferable that the first through hole 7 be disposed only in the flow channel member 4, and the first opening 7a be disposed in the flow channel member 4. For that purpose, the fourth region E5 is formed in such a shape as to project beyond the piezoelectric actuator substrate 21.

The second opening 7b preferably opens into a portion of the head body 21 other than the first major surface 2a-1. Part of the discharged liquid drifts as mist on the first major surface 2a-1. Therefore, the second opening 7b is disposed at the portion other than the first major surface 2a-1, thereby making it difficult for the mist to enter the first through hole 7. More preferably, the second opening 7b is disposed in the second major surface 2a-2 of the head body 2a. Consequently, the mist generated on the first major surface 2a-1 does not reach the second opening 7b unless the mist moves in a wrap-around manner via the side surface of the head body 2a. This makes it difficult for the mist to enter the first through hole 7. A moving distance until the mist reaches the second opening 7b increases, making it difficult for the mist to enter the first through hole 7.

To be specific, the flow channel member 4 is formed by thermally pressing the plates 4a to 4i with an adhesive member interposed therebetween. The piezoelectric actuator substrate 21 and the flow channel member 4 are thermally pressed with the adhesive member interposed therebetween. That is, heat may be applied to the piezoelectric actuator substrate 21 during the manufacturing processes of the head body 2a. During use of the liquid discharge head 2, heat may occur on the piezoelectric actuator substrate 21, and heat may transfer from other portions of the liquid discharge head 2 and from the outside of the liquid discharge head 2. Thus, when the heat is applied to the piezoelectric actuator substrate 21 during the manufacturing processes or use of the liquid discharge head 2, the air in the space S1 may expand. In the absence of the first through hole 7 in the liquid discharge head 2, the space S1 is to be completely closed. If the space S1 is completely closed, the flexible wiring substrate 92 may be subjected to stress due to the expansion of the air in the space S1. Consequently, the flexible wiring substrate 92 may separate from the second major surface 2a-2 of the head body 2a. If the flexible wiring substrate 92 separates from the second major surface 2a-2 of the head body 2a, the liquid that has entered between the flexible wiring substrate 92 and the pressurizing chamber surface 4-2 may come into contact with the individual electrodes 25, and a malfunction may occur on the piezoelectric actuator substrate 21. Even if the flexible wiring substrate 92 does not separate from the second major surface 2a-2 of the head body 2a, the electrical connection between the individual electrodes 25 and the land 92a may separate. Depending on a manufacturing process, temperatures during general manufacturing processes including resin curing and thermal joining are approximately 100-200° C. (or higher temperatures in some cases), whereas temperatures during the use are as high as approximately 60° C. It is therefore highly necessary to cope with the temperatures during the manufacturing processes. Hence, the first through hole may be closed after the manufacturing process requiring high temperatures (for example, 100° C. or higher).

In the liquid discharge head 2, the head body 2a has the first through hole 7. The first through hole 7 permits communication between the space S1 and the outside of the head body 2a. That is, an air flow passage is disposed between the space S1 and the outside of the head body 2a, thereby making it possible to reduce the possibility that air expands in the space S1. It is therefore possible to reduce that possibility that the flexible wiring substrate 92 separates from the second major surface 2a-2 of the head body 2a due to the stress applied to the flexible wiring substrate 92. This makes it possible to reduce the possibility that a malfunction occurs on the piezoelectric actuator substrate 21 due to the contact between the liquid and the individual electrodes 25.

The first opening 7a and the second opening 7b preferably open into the pressurizing chamber surface 4-2 as in the present embodiment. That is, the first opening 7a and the second opening 7b preferably open into an identical surface. This configuration contributes to reducing the possibility that a liquid reaches the space S1 even if the liquid enters from the second opening 7b into the first through hole 7. This makes it possible to further reducing the possibility of the contact between the liquid and the individual electrodes 25.

In the present embodiment, the single liquid discharge head 2 includes the four piezoelectric actuator substrates 21. In each of the four piezoelectric actuator substrates 21, the single space S1 is disposed so as to seal all of the individual electrodes 25 disposed on the single piezoelectric actuator substrate 21. However, any other embodiment may be employed. For example, the number of the piezoelectric actuator substrates 21 may be one or any number. A plurality of the spaces S1 may be disposed for a single piezoelectric actuator substrate 21. For example, a plurality of groups of the individual electrodes 25 may be disposed, and the space S1 may be disposed in each of the groups so as to surround the second adhesive member 60. When a plurality of the piezoelectric actuator substrates 21 are disposed, the space S1 may be disposed across the piezoelectric actuator substrates 21. When a plurality of the spaces S1 are disposed in a single liquid discharge head 2, a through hole communicating with some spaces S1 may not directly communicate with the outside but communicate with the outside via another space S1 and the first through hole 7 communicating with the another space S1.

The second opening 7b preferably lies in the mounting region E1 as in the present embodiment. In other words, the second opening 7b is preferably overlapped with the mounting surface 40-1 of the reservoir 40. This configuration contributes to reducing the possibility that a liquid enters on the mounting region E1 even if the liquid enters on the pressurizing chamber surface 4-2. That is, it is possible to reduce the possibility that the liquid enters the second opening 7b.

The first opening 7a is preferably disposed side by side with the mounting region E1 as in the present embodiment. This configuration contributes to relatively decreasing a separation distance between the first opening 7a and the second opening 7b. This makes it possible to reduce a proportion of the first through holes 7 in the flow channel member 4. It is therefore possible to reduce the possibility that the formation of the individual flow channels 12 is inhibited by the presence of the first through hole 7.

The reservoir 40 preferably has a second through hole 41 disposed from the mounting surface 40-1 to the upper surface 40-2 as in the present embodiment. Specifically, as shown in FIG. 9, the second through hole 41 has a third opening 41a that opens into the mounting surface 40-1, and a fourth opening 41b that opens into the upper surface 40-2. The third opening 41a is overlapped with the second opening 7b. This makes it possible to further reduce the possibility that the flexible wiring substrate 92 separates from the second major surface 2a-2 of the head body 2a.

To be specific, the reservoir 40 is adhered onto the pressurizing chamber surface 4-2 of the flow channel member 4 with the first adhesive member 50 interposed therebetween. Specifically, the mounting surface 40-1 of the reservoir 40 is thermally pressed onto the mounting region E1 of the flow channel member 4 with the first adhesive member 50 interposed therebetween. That is, heat may be applied to the piezoelectric actuator substrate 21 in an adhesion process between the reservoir 40 and the flow channel member 4. Therefore, in the present embodiment, the reservoir 40 has the second through hole 41. The third opening 41a is overlapped with the second opening 7b. That is, the second through hole 41 communicates with the first through hole 7. Consequently, the space S1 communicates with the flow channel member 4 and the outside of the reservoir 40 via the first through hole 7 and the second through hole 41. Hence, even if the heat generated in the adhesion process between the reservoir 40 and the flow channel member 4 is transferred to the piezoelectric actuator substrate 21, it is possible to reduce the possibility of expansion of the air in the space S1. This makes it possible to further reduce the possibility that the flexible wiring substrate 92 separates from the second major surface 2a-2 of the head body 2a.

FIG. 9 shows the reservoir 40 with parts omitted. Specifically, the reservoir 40 includes, besides the second through hole 41, a liquid supply passage communicating with the supply hole 5a of the manifold 5. Similarly to, for example, the flow channel member 4, the reservoir 40 is made up of a plurality of plates laminated one upon another. In this case, the second through hole 41 and the liquid supply passage are respectively configured by allowing holes formed in the plates to communicate with each other. The plates are, for example, those similar to the flow channel member 4.

The fourth opening 41b preferably opens into the upper surface 40-2 as in the present embodiment. The upper surface 40-2 is a surface lying opposite the mounting surface 40-1. That is, the upper surface 40-2 is a surface lying relatively away from the pressurizing chamber surface 4-2. The pressurizing chamber surface 4-2 is a surface onto which a liquid is apt to enter, for example, through between the housing 90 and the flow channel member 4, or along the inner wall of the housing 90. In the present embodiment, the fourth opening 41b opens into the upper surface 40-2, making it possible to reduce the possibility that the liquid enters the fourth opening 41b. This contributes to reducing the possibility that the liquid enters the space S1 via the second through hole 41 and the first through hole 7.

The second through hole 41 preferably has a first portion 41c, a second portion 41d, and a third portion 41e as in the present embodiment. Specifically, the first portion 41c is the portion extending from the third opening 41a to the upper surface 40-2. The second portion 41b is the portion extending from the fourth opening 41b to the mounting surface 40-1. The third portion 41e is the portion connecting an end of the first portion 41c and an end of the second portion 41d. In FIG. 9, a region on which the third portion 41e lies is surrounded by one-dot chain line. The end of the first portion 41 lies closer to the upper surface 40-2 than the end of the second portion 41d. Therefore, even if a liquid enters from the fourth opening 41b into the second through hole 41, it is possible to reduce the possibility that the liquid enters the first portion 41c through the third portion 41e. This contributes to reducing the possibility that the liquid enters the space S1.

Figure 10:
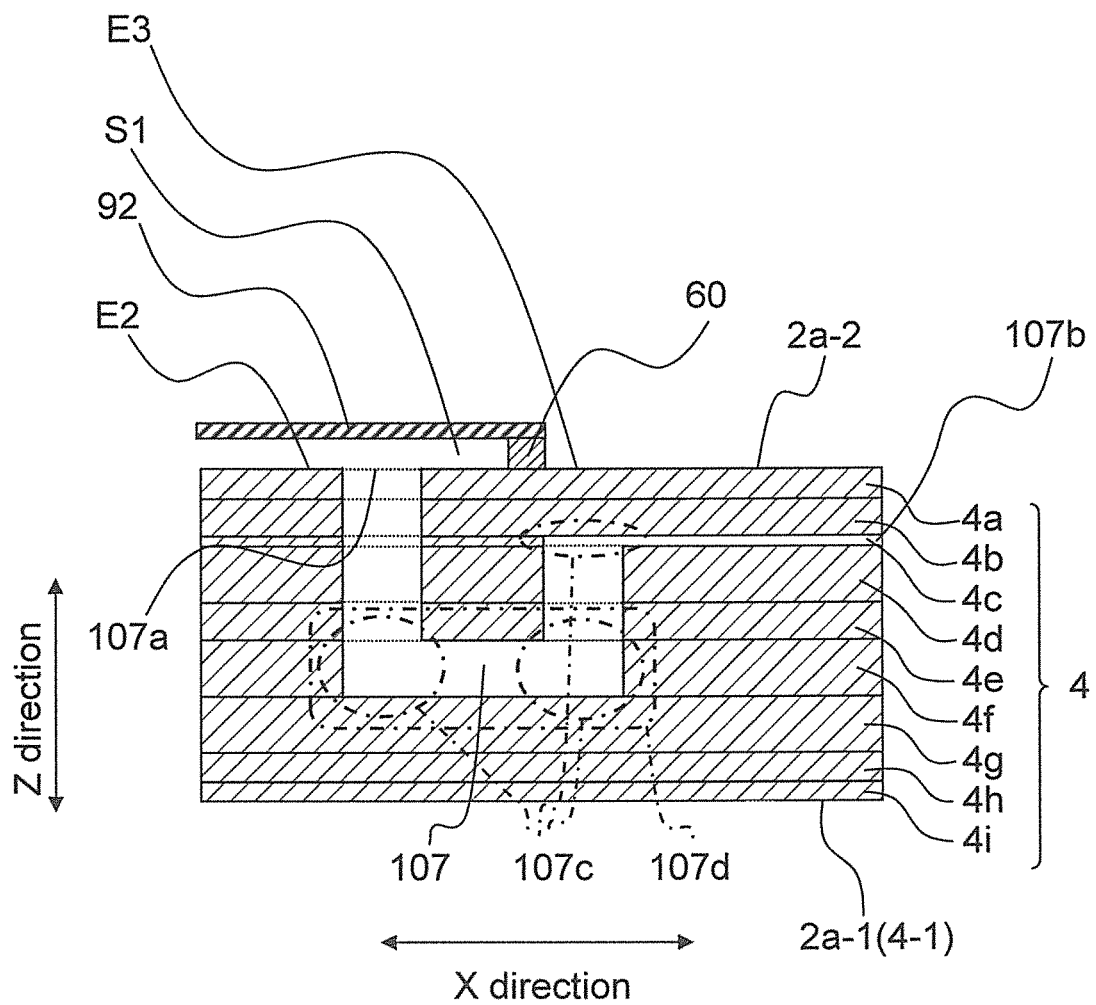
FIG. 10 is a longitudinal sectional view of a head body according to another embodiment of the present invention.

FIG. 10 is a longitudinal sectional view of a head body 2a used for a liquid discharge head 2 according to another embodiment of the present invention. The head body 2a has the same basic configuration as that shown in FIGS. 2 to 8. Components having a minor difference are identified by the same reference numerals, and their respective descriptions are omitted. FIG. 10 is the longitudinal sectional view different from the longitudinal sectional view shown in FIG. 9 by an angle of 90 degrees.

In the head body 2a shown in FIG. 10, a first through hole 107 permits communication between a first opening 107a that opens into a second major surface 2a-2 of the head body 2a, and a second opening 107b that opens into a side surface of the head body 2a. The first through hole 107 goes from the first opening 107a sequentially through the holes of plates 4a, 4b, 4c, and 4d toward a first major surface 2a-1 in Z direction, goes through a through groove of the plate 4e to a side surface of a long side of the flow channel member 4 in the X direction, goes through the holes of the plates 4d and 4c to the second major surface 2a-2 of the head body 2a in the Z direction, and goes through a through groove of the plate 4b to the side surface of the long side of the flow channel member in the X direction, thereby communicating with the second opening 107b. The plate 4b has a small thickness in order to form an aperture 6, and has a large ratio of length to a cross section of a through hole at that portion. The first through hole 107 includes the groove of the plate 4b, so that the first through hole 107 becomes narrower and longer to make it easier for mist to attach to an inner wall thereof on the way.

The liquid discharge head 2 is subjected to a larger temperature change and a larger volume change in the air in the space S1 (strictly speaking, a volume change corresponding to an amount exceeding an allowable maximum volume change of the space S1) during the manufacturing processes of the liquid discharge head 2 than those during the use thereof. Therefore, a problem, such as the separation of the second adhesive member 60, is more likely to occur during the manufacturing processes. As long as being capable of withstanding the temperature change during the use, the second opening 107b may be closed after completion of a process among the manufacturing processes which is subjected to a large temperature change.

Even during the use, mist of the discharged liquid may enter when the space S1 is communicated with the outside. When, after having a high temperature during the use, the temperature is lowered to room temperature, if mist exists in surroundings, the mist may be sucked into the first through hole 107 due to volumetric shrinkage of the air in the space S1. Assuming a higher temperature 60° C. during the use, a volume ratio to gas having room temperature 25° C. is $(273+60)/(273+25) \cong 1.12$. Therefore, as long as the volume of the first through hole 107 with respect to the volume of the space S1 is 12% or more, even when the temperature is lowered from 60° C. to 25° C., gas that has entered from the outside does not reach the first opening 107a, thereby preventing mist and the like from entering together with the gas. Even for an ink that is desirably used at high temperatures, the ink is often usable after being heated to approximately 60° C. However, for example, when the liquid discharge head 2 is used in a process for manufacturing an object, it is also conceivable that the liquid discharge head 2 is to be subjected to a still higher temperature environment. Assuming the use thereof under an environment of 80° C., a volume ratio to gas having room temperature 25° C. is $(273+80)/(273+25) \cong 1.18$. Accordingly, the volume of the first through hole 107 with respect to the volume of the space S1 is more preferably set to 18% or more.

No mist seems to exist but other foreign matter may enter during the manufacturing processes. The prevention of entrance of the foreign matter during the manufacturing processes can be handled by controlling the degree of cleanliness in environment. However, assuming that a processing temperature is up to approximately 200° C., the volume ratio to the gas having room temperature 25° C. is $(273+200)/(273+25) \cong 1.59$. Accordingly, the volume of the first through hole 107 with respect to the volume of the space S1 may be 59% or more.

The foregoing is also true for the case where the second through hole 41 is communicated with the first through hole 107. Accordingly, a total volume of the first through hole 107 and the second through hole 41 with respect to the volume of the space S1 may be preferably 12% or more, more preferably 18% or more, and particularly 59% or more in each of the foregoing cases.

In a continuous use environment, gas loading and unloading through the first through hole 107 occur less frequently, and therefore, the mist that has entered the first through hole 107 seems to move at random. When the first through hole 107 is narrow and long, the mist is more likely to attach to an inner wall of the first through hole 107 than flowing along the first through hole 107. When the first through hole 107 has a ratio of length to width of 5 times or more, it is difficult for the mist moving at random to move from the second opening 107b to the first opening 107a. The ratio of length to width is more preferably 10 times or more.

When a cross-sectional area of the first through hole 107 (a cross-sectional area in a direction orthogonal to a direction along the first through hole 107) is constant, a ratio (L/R) of a length L (mm) of the first through hole 107 along the first through hole 107 to a diameter R (mm) obtained by converting the cross-sectional area into a circle (the diameter of the circle having the same area as the cross-sectional area) may be the ratio of length to width.

When the cross-sectional area of the first through hole 107 is not constant, a similar calculation may be made using a value obtained by dividing the volume of the first through hole 107 by the length of the first through hole 107 as a mean cross-sectional area.

The first through hole 107 has three corner portions 107c that are bent at an angle of 90 degrees or less. When mist or the like tries to go from the first opening 107a to the second opening 107b via the corner portions 107c, the mist or the like is highly likely to attach to an inner wall of a front surface without turning, thereby reducing the possibility of reaching the first opening 107b.

The first through hole 107 includes a folding-back portion 107d at which a direction extending from the second opening 107b to the first opening 207a and along the first through hole 107 is reversed. That is, a direction in which the mist or the like enters the folding-back portion 107d is opposite to a direction in which the mist or the like comes out of the folding-back portion 107d. If the mist or the like tries to pass through the folding-back portion 107d, it is necessary to reverse a flow direction during that period. It is therefore highly likely to attach to the inner wall on the way, making it possible to reduce the possibility of reaching the first opening 107b.

If either the direction in which the mist or the like enters the folding-back portion 107d or the direction in which the mist or the like comes out of the folding-back portion 107d is opposite to gravity direction, the mist is less likely to move against gravity, thereby reducing the possibility of reaching the first opening 107b. When there are a plurality of the folding-back portions 107d and the first through hole 107 has a meander shape, it is possible to further reduce the possibility of reaching the first opening 107b.

Figure 11:
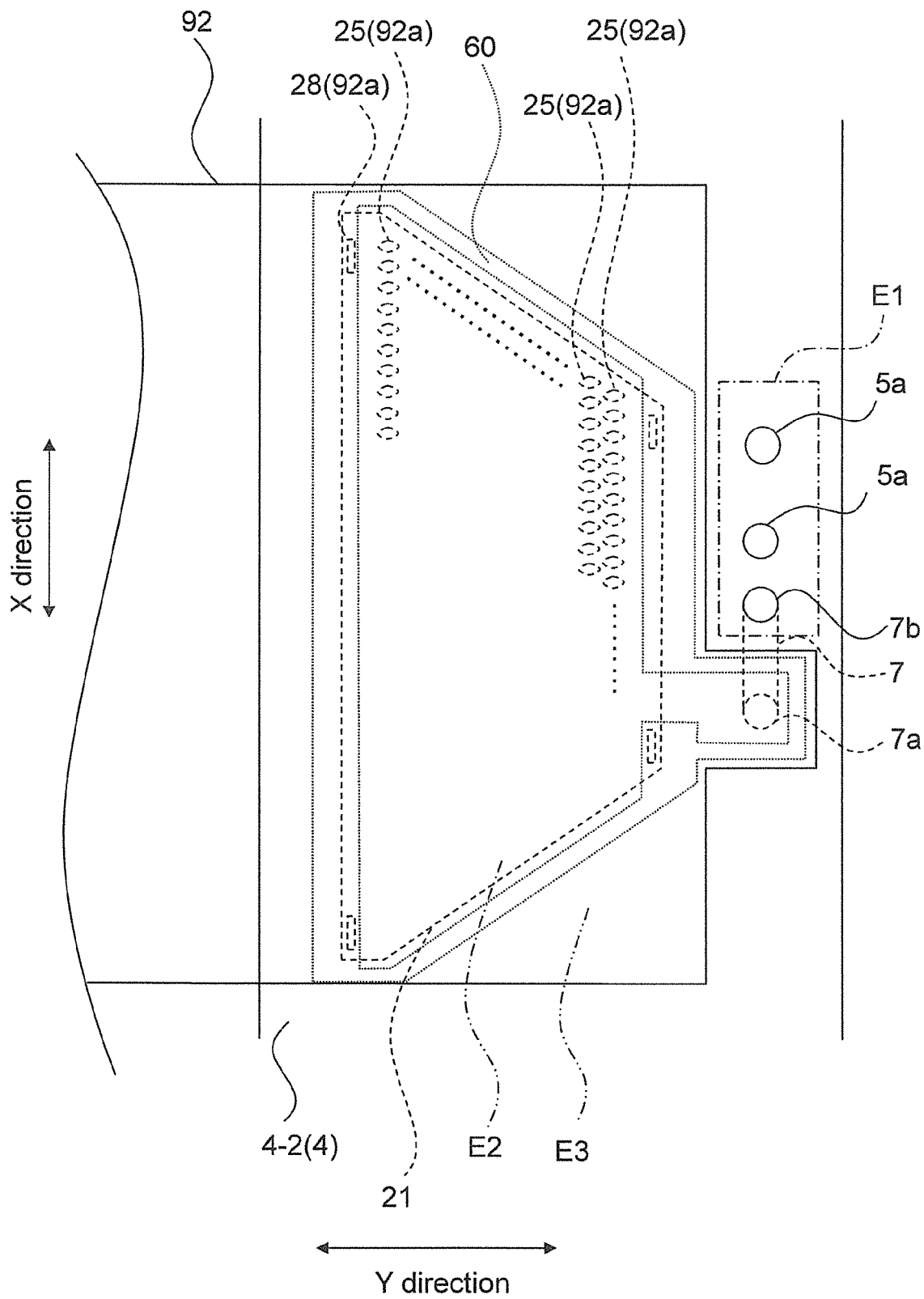
FIG. 11 is a plan view schematically showing a configuration of a head body according to still another embodiment of the present invention.

FIG. 11 is an enlarged plan view of a head body 2a used for a liquid discharge head 2 according to still another embodiment of the present invention. The head body 2a has the same basic configuration as that shown in FIGS. 2 to 8. Components having a minor difference are identified by the same reference numerals, and their respective descriptions are omitted. FIG. 11 is the enlarged plan view showing the same part as that of FIG. 8.

A ground electrode 28 is disposed on a major surface of a piezoelectric actuator substrate 21 in FIG. 11. The ground electrode 28 is electrically connected to a common electrode 24 through a via hole conductor (not shown) passing through a piezoelectric ceramic layer 21b. The ground electrode 28 is electrically connected to a land 92a of a flexible wiring substrate 92 through a connection part (not shown). A driving signal is transmitted to each of individual electrodes 25 as a voltage on the basis of the ground electrode 28 that is held at ground.

The ground electrode 28 is disposed outside a region in which the individual electrodes 25 are disposed. A second adhesive member 60 is disposed in a portion at which the ground electrode 28 is disposed, and the connection part is buried in the second adhesive member 60. A connection by the connection part enhances adhesion between the flexible wiring substrate 92 and the head body 2a owing to the second adhesive member 60. Consequently, for example, separation of the second adhesive member 60 is less likely to occur.

In some cases, part of intervals between a plurality of the individual electrodes 25 disposed on the single piezoelectric actuator substrate 21 is larger than other intervals. For example, the individual electrodes 25 constitute a plurality of groups per ink color to be discharged, these groups are preferably disposed away from one another in order to prevent color mixture between discharge holes 8 on a discharge hole surface 4-1. Specifically, the single piezoelectric actuator substrate 21 includes 16 rows of the individual electrodes 25, and four rows constitute a group. When any one of the colors C, M, Y, and B is printed by each of the groups, a distance between the groups made up of the four rows is made loner than a distance between the rows in the groups. In this case, a space utilization efficiency can be enhanced by disposing the first opening 7a between the groups. That is, the disposing of the first opening 7a between the groups causes no increase in size of the piezoelectric actuator substrate 21, or minimizes the increase. In this case, the first through hole 7 is disposed so as to pass through the piezoelectric actuator substrate 21.

DESCRIPTION OF REFERENCE NUMERALS

E2 first region
E3 second region
E4 third region
E5 fourth region
S1 space
1 printer (recording apparatus)
2 liquid discharge head
2a head body
2a-1 first major surface (discharge hole surface) of head body
2a-2 second major surface of head body
4 flow channel member
4-1 discharge hole surface (first major surface of flow channel member)
4-2 pressurizing chamber surface
7, 107 first through hole
7a, 107a first opening
7b, 107b second opening
107c corner portion
107d folding-back portion
8 discharge hole
10 pressurizing chamber
13 adhesive member
21 piezoelectric actuator substrate
25 individual electrode
28 ground electrode
40 reservoir (supply part)
40-1 mounting surface (third major surface of reservoir)
40-2 upper surface (fourth major surface of reservoir)
41 second through hole
41a third opening
41b fourth opening
41c first portion
41d second portion
41e third portion
50 first adhesive member
60 second adhesive member (adhesive member)
92 flexible wiring substrate
92a land (of flexible wiring substrate)
120 transport unit (transport section)

The invention claimed is:

1. A liquid discharge head, comprising:
a head body comprising a flow channel member that comprises a plurality of discharge holes and a plurality of pressurizing chambers respectively individually connected to the discharge holes, and a piezoelectric actuator substrate that comprises a plurality of individual electrodes to pressurize the pressurizing chambers and is disposed on the flow channel member;
a flexible wiring substrate electrically connected to the individual electrodes; and
an adhesive member adhering the flexible wiring substrate and the head body and surrounding the individual electrodes in a plan view,
wherein, when a surface of the head body surrounded by the adhesive member is taken as a first region and a surface of the head body other than the first region is taken as a second region in the plan view, the head body includes a first through hole permitting communication between a first opening that opens into the first region and a second opening that opens into the second region, and
wherein the first through hole permits communication between a space surrounded by the flexible wiring substrate, the adhesive member, and the first region, and an outside other than the space, and
in a plan view, the first region includes a third region including all of the individual electrodes surrounded by the adhesive member, and a fourth region protruding from the third region, and the first opening is disposed in the fourth region.

2. The liquid discharge head according to claim 1, wherein in a plan view, the individual electrodes are disposed so as to spread in a plane direction, the first opening is disposed in a region whose outer edge is the individual electrode disposed at an outermost side among the individual electrodes, and the first through hole passes through the piezoelectric actuator substrate.

3. The liquid discharge head according to claim 1, wherein a volume of the first through hole is 12% or more of a volume of the space.

4. The liquid discharge head according to claim 1, a ratio (L/R) of a length L (mm) of the first through hole to a diameter R (mm) obtained by converting a cross-sectional area into a circle is 5 or more.

5. The liquid discharge head according to claim 1, wherein the first through hole has a corner portion bent at an angle of 90 degrees or less.

6. The liquid discharge head according to claim 1, wherein the first through hole has a folding-back portion at which a direction extending from the second opening to the first opening and along the first through hole is reversed.

7. The liquid discharge head according to claim 1, wherein in a plan view, a distance between the pressurizing chamber closest to the adhesive member among the pressurizing chambers corresponding to the individual electrodes surrounded by the adhesive member, and the adhesive member is not less than a diameter of a circle obtained by converting an area of the pressurizing chamber closest to the adhesive member into a circle.

8. The liquid discharge head according to claim 1,
wherein the adhesive member is disposed at a part of the major surface of the piezoelectric actuator substrate,
wherein a ground electrode of the piezoelectric actuator substrate is disposed at a portion of the major surface of the piezoelectric actuator substrate in which the adhesive member is disposed,
wherein the ground electrode and the flexible wiring substrate are electrically connected to each other via a connection part, and
wherein the connection part is embedded in the adhesive member.

9. A recording apparatus, comprising:
a liquid discharge head according to claim 1; and
a transport section configured to transport a recording medium to the liquid discharge head.

10. A liquid discharge head, comprising:
a head body comprising a flow channel member that comprises a plurality of discharge holes and a plurality of pressurizing chambers respectively individually connected to the discharge holes, and a piezoelectric actuator substrate that comprises a plurality of individual electrodes to pressurize the pressurizing chambers and is disposed on the flow channel member;
a flexible wiring substrate electrically connected to the individual electrodes; and
an adhesive member adhering the flexible wiring substrate and the head body and surrounding the individual electrodes in a plan view,
wherein, when a surface of the head body surrounded by the adhesive member is taken as a first region and a surface of the head body other than the first region is taken as a second region in the plan view, the head body includes a first through hole permitting communication between a first opening that opens into the first region and a second opening that opens into the second region,
wherein the first through hole permits communication between a space surrounded by the flexible wiring substrate, the adhesive member, and the first region, and an outside other than the space, and
wherein a ratio (L/R) of a length L (mm) of the first through hole to a diameter R (mm) obtained by converting a cross-sectional area into a circle is 5 or more.

11. A recording apparatus, comprising:
a liquid discharge head according to claim 10; and
a transport section configured to transport a recording medium to the liquid discharge head.

12. A liquid discharge head, comprising:
a head body comprising a flow channel member that comprises a plurality of discharge holes and a plurality of pressurizing chambers respectively individually connected to the discharge holes, and a piezoelectric actuator substrate that comprises a plurality of individual electrodes to pressurize the pressurizing chambers and is disposed on the flow channel member;
a flexible wiring substrate electrically connected to the individual electrodes; and
an adhesive member adhering the flexible wiring substrate and the head body and surrounding the individual electrodes in a plan view,
wherein, when a surface of the head body surrounded by the adhesive member is taken as a first region and a surface of the head body other than the first region is taken as a second region in the plan view, the head body includes a first through hole permitting communication between a first opening that opens into the first region and a second opening that opens into the second region,
wherein the first through hole permits communication between a space surrounded by the flexible wiring substrate, the adhesive member, and the first region, and an outside other than the space, and
wherein the first through hole has a corner portion bent at an angle of 90 degrees or less.

13. A recording apparatus, comprising:
a liquid discharge head according to claim 12; and
a transport section configured to transport a recording medium to the liquid discharge head.

14. A liquid discharge head, comprising:
a head body comprising a flow channel member that comprises a plurality of discharge holes and a plurality of pressurizing chambers respectively individually connected to the discharge holes, and a piezoelectric actuator substrate that comprises a plurality of individual electrodes to pressurize the pressurizing chambers and is disposed on the flow channel member;
a flexible wiring substrate electrically connected to the individual electrodes; and
an adhesive member adhering the flexible wiring substrate and the head body and surrounding the individual electrodes in a plan view,
wherein, when a surface of the head body surrounded by the adhesive member is taken as a first region and a surface of the head body other than the first region is taken as a second region in the plan view, the head body includes a first through hole permitting communication between a first opening that opens into the first region and a second opening that opens into the second region,
wherein the first through hole permits communication between a space surrounded by the flexible wiring substrate, the adhesive member, and the first region, and an outside other than the space, and
wherein in a plan view, a distance between the pressurizing chamber closest to the adhesive member among the pressurizing chambers corresponding to the individual electrodes surrounded by the adhesive member, and the adhesive member is not less than a diameter of a circle obtained by converting an area of the pressurizing chamber closest to the adhesive member into a circle.

15. A recording apparatus, comprising:
a liquid discharge head according to claim 14; and
a transport section configured to transport a recording medium to the liquid discharge head.

16. A liquid discharge head, comprising:
a head body comprising a flow channel member that comprises a plurality of discharge holes and a plurality of pressurizing chambers respectively individually connected to the discharge holes, and a piezoelectric actuator substrate that comprises a plurality of individual electrodes to pressurize the pressurizing chambers and is disposed on the flow channel member;
a flexible wiring substrate electrically connected to the individual electrodes; and
an adhesive member adhering the flexible wiring substrate and the head body and surrounding the individual electrodes in a plan view,
wherein, when a surface of the head body surrounded by the adhesive member is taken as a first region and a surface of the head body other than the first region is taken as a second region in the plan view, the head body includes a first through hole permitting communication between a first opening that opens into the first region and a second opening that opens into the second region,
wherein the first through hole permits communication between a space surrounded by the flexible wiring substrate, the adhesive member, and the first region, and an outside other than the space,
wherein the head body comprises a first major surface having the discharge holes located therein, and a second major surface located opposite the first major surface, and
wherein the first opening is disposed in the second major surface, and the second opening is disposed in a surface other than the first major surface.

17. The liquid discharge head according to claim 16, wherein the piezoelectric actuator substrate is smaller than the second major surface in a plan view, and the second opening is disposed in the second major surface.

18. The liquid discharge head according to claim 17, further comprising:
a supply part including a third major surface opposed to the second major surface of the head body, and supplies a liquid to the pressurizing chambers,
wherein the second opening is overlapped with the third major surface.

19. The liquid discharge head according to claim 18,
wherein the supply part includes a second through hole extending from the third major surface to a surface other than the third major surface,
wherein the second through hole includes a third opening that opens into the third major surface, and a fourth opening that opens into a surface other than the third major surface, and
wherein the third opening is overlapped with the second opening in a plan view.

20. A recording apparatus, comprising:
a liquid discharge head according to claim 16; and
a transport section configured to transport a recording medium to the liquid discharge head.

* * * * *